US009809402B2

(12) United States Patent
Nelson et al.

(10) Patent No.: US 9,809,402 B2
(45) Date of Patent: Nov. 7, 2017

(54) SEGMENTED BIN SWEEP SYSTEM

(71) Applicants: Chris Nelson, Denton, TX (US);
William A. Witt, Perham, MN (US)

(72) Inventors: Chris Nelson, Denton, TX (US);
William A. Witt, Perham, MN (US)

(73) Assignee: Sioux Steel Company, Sioux Falls, SD (US)

( * ) Notice: Subject to any disclaimer, the term of this patent is extended or adjusted under 35 U.S.C. 154(b) by 220 days.

(21) Appl. No.: 14/868,531

(22) Filed: Sep. 29, 2015

(65) Prior Publication Data

US 2016/0096695 A1 Apr. 7, 2016

Related U.S. Application Data

(60) Provisional application No. 62/060,101, filed on Oct. 6, 2014, provisional application No. 62/086,287, filed on
(Continued)

(51) Int. Cl.
*B65G 65/48* (2006.01)
*B65G 65/28* (2006.01)
(Continued)

(52) U.S. Cl.
CPC ......... *B65G 65/4836* (2013.01); *B65G 65/28* (2013.01); *B65G 65/425* (2013.01); *A01F 25/2018* (2013.01)

(58) Field of Classification Search
CPC .... B65G 65/28; B65G 65/425; B65G 65/466; B65G 65/4809; B65G 65/4818;
(Continued)

(56) References Cited

U.S. PATENT DOCUMENTS

| 822,547 A | 6/1906 | Nicolson |
| 2,646,023 A | 7/1953 | Virgil |

(Continued)

FOREIGN PATENT DOCUMENTS

| CA | 2312068 | 12/2001 |
| FR | 1032110 | 6/1953 |

(Continued)

OTHER PUBLICATIONS

Sudenga Industries, Inc., Press Release, Nov. 1, 2004, pp. 1-1.
G & G Manufacturing SC-X 4 Ratchet Slip Clutches, Jun. 17, 2012, https://web.archive.org/web/20120617003451/http://www.ggmfg.com/Products/CouplersClutches/SCX4RatchetSlipClutches.aspx.

*Primary Examiner* — Glenn Myers
(74) *Attorney, Agent, or Firm* — Jeffrey A. Proehl; Woods Fuller Shultz & Smith P.C.

(57) ABSTRACT

A bin sweep system for a bin having a floor surface and a central well may comprise a center post defining a common center and a sweep assembly configured to move across the floor surface of the bin and having an inboard end and an outboard end. The sweep assembly may comprise at least two sweep segments including a first sweep segment and a second sweep segment, with the first sweep segment being located toward the inboard end and the second sweep segment being located toward the outboard end. At least one of the sweep segments may be movable about the center post substantially independently of another of the sweep segments.

19 Claims, 21 Drawing Sheets

Related U.S. Application Data on Dec. 2, 2014, provisional application No. 62/126,921, filed on Mar. 2, 2015.

(51) Int. Cl.
*B65G 65/42* (2006.01)
*A01F 25/20* (2006.01)

(58) Field of Classification Search
CPC  B65G 65/4836; B65G 65/4854; B65G 65/20; B65G 65/38; B65G 65/42; B65G 19/22; B65G 65/08; A01F 25/2018; B65D 88/68
See application file for complete search history.

(56) References Cited

U.S. PATENT DOCUMENTS

| | | |
|---|---|---|
| 2,763,362 A | 9/1956 | Greaves |
| 2,790,563 A * | 4/1957 | McCarthy ............ B65G 65/466 198/587 |
| 2,801,137 A | 7/1957 | Clay |
| 3,014,575 A | 12/1961 | Klein |
| 3,035,718 A | 5/1962 | Behlen |
| 3,065,996 A | 11/1962 | Patiz |
| 3,067,914 A | 12/1962 | Ellaby |
| 3,175,676 A | 3/1965 | Vander Schaff |
| 3,181,715 A | 5/1965 | Olson |
| 3,204,786 A | 9/1965 | Kucera |
| 3,228,514 A | 1/1966 | Kucera |
| 3,229,665 A | 1/1966 | Baltz |
| 3,229,827 A | 1/1966 | Kucera |
| 3,231,106 A | 1/1966 | Bruecker |
| 3,291,325 A | 12/1966 | Henningson |
| 3,297,146 A | 1/1967 | Munger |
| 3,338,636 A | 8/1967 | Chapman |
| 3,438,517 A | 4/1969 | Steffen |
| 3,451,567 A | 6/1969 | Laidig |
| 3,455,470 A | 7/1969 | Kanagy |
| 3,472,357 A | 10/1969 | Strocker |
| 3,486,643 A | 12/1969 | Smith |
| 3,647,094 A | 3/1972 | Jackson |
| 3,828,916 A | 8/1974 | Patz |
| 3,838,780 A | 10/1974 | Ridlehuber |
| 3,908,840 A | 9/1975 | Lambert |
| 3,946,861 A | 3/1976 | Sandefur |
| 3,974,908 A | 8/1976 | Keichinger |
| 3,980,186 A * | 9/1976 | Leith .................. A01F 25/2009 414/295 |
| 3,986,600 A | 10/1976 | Pentith |
| 4,022,335 A | 5/1977 | Lambert |
| RE29,309 E | 7/1977 | Patterson |
| 4,057,151 A | 11/1977 | Weaver |
| 4,230,222 A | 10/1980 | Clark |
| 4,242,028 A | 12/1980 | Van Dusen |
| 4,313,705 A | 2/1982 | Jackson |
| 4,329,105 A | 5/1982 | Buschbom |
| 4,451,192 A | 5/1984 | Wood |
| 4,516,898 A | 5/1985 | Cantenot |
| 4,583,903 A | 4/1986 | Hutchison |
| 4,619,330 A | 10/1986 | Machnee |
| 4,619,577 A | 10/1986 | Swanson |
| 4,621,968 A | 11/1986 | Hutchison |
| 4,655,666 A | 4/1987 | Cantenot |
| 4,658,911 A | 4/1987 | Drever |
| 4,669,941 A | 6/1987 | West |
| 4,762,220 A | 8/1988 | Lutke |
| 4,773,808 A | 9/1988 | Fischer |
| 4,775,278 A | 10/1988 | Fischer |
| 4,824,312 A | 4/1989 | Schiltz |
| 4,875,820 A | 10/1989 | Lepp |
| 4,998,855 A | 3/1991 | Tschernatsch |
| 5,088,871 A | 2/1992 | Mellish |
| 5,099,983 A | 3/1992 | Valdez |
| 5,186,596 A | 2/1993 | Boucher |
| 5,203,802 A | 4/1993 | Denis |
| 5,540,533 A | 7/1996 | Eskelinen |
| 5,639,200 A | 6/1997 | Jiskoot |
| 5,769,590 A | 6/1998 | Weikel |
| 5,788,055 A | 8/1998 | Stewart |
| 6,017,180 A | 1/2000 | Wilham |
| 6,039,647 A | 3/2000 | Weikel |
| 6,203,261 B1 | 3/2001 | South |
| 6,254,329 B1 | 7/2001 | Sukup |
| 6,280,331 B1 | 8/2001 | Tuttlebee |
| 6,281,610 B1 | 8/2001 | Kliman |
| 6,499,930 B1 * | 12/2002 | Dixon .................... B65G 69/08 198/520 |
| 6,640,451 B1 | 11/2003 | Vinarcik |
| 6,948,902 B2 | 9/2005 | Hanig |
| 7,210,538 B2 | 5/2007 | Gust |
| 7,544,031 B2 | 6/2009 | Kaeb |
| 7,588,405 B2 | 9/2009 | Johnson |
| 7,967,542 B2 | 6/2011 | Epp |
| 8,657,025 B2 | 2/2014 | Thompson |
| 8,770,388 B1 | 7/2014 | Chaon |
| 2004/0146381 A1 | 7/2004 | Hanson |
| 2004/0213650 A1 | 10/2004 | Epp |
| 2005/0254922 A1 | 11/2005 | Berraeu |
| 2005/0263372 A1 | 12/2005 | Hollander |
| 2006/0245864 A1 | 11/2006 | Epp |
| 2006/0285942 A1 | 12/2006 | Fridgen |
| 2010/0239399 A1 | 9/2010 | Hoogestraat |
| 2013/0064629 A1 | 3/2013 | Schuelke |
| 2013/0216341 A1 | 8/2013 | Luster |

FOREIGN PATENT DOCUMENTS

| | | |
|---|---|---|
| FR | 2309442 | 11/1976 |
| FR | 2348132 | 11/1977 |
| FR | 2630620 | 11/1989 |
| GB | 1327791 | 8/1973 |
| GB | 2069448 | 8/1981 |
| GB | 2076357 | 12/1981 |

\* cited by examiner

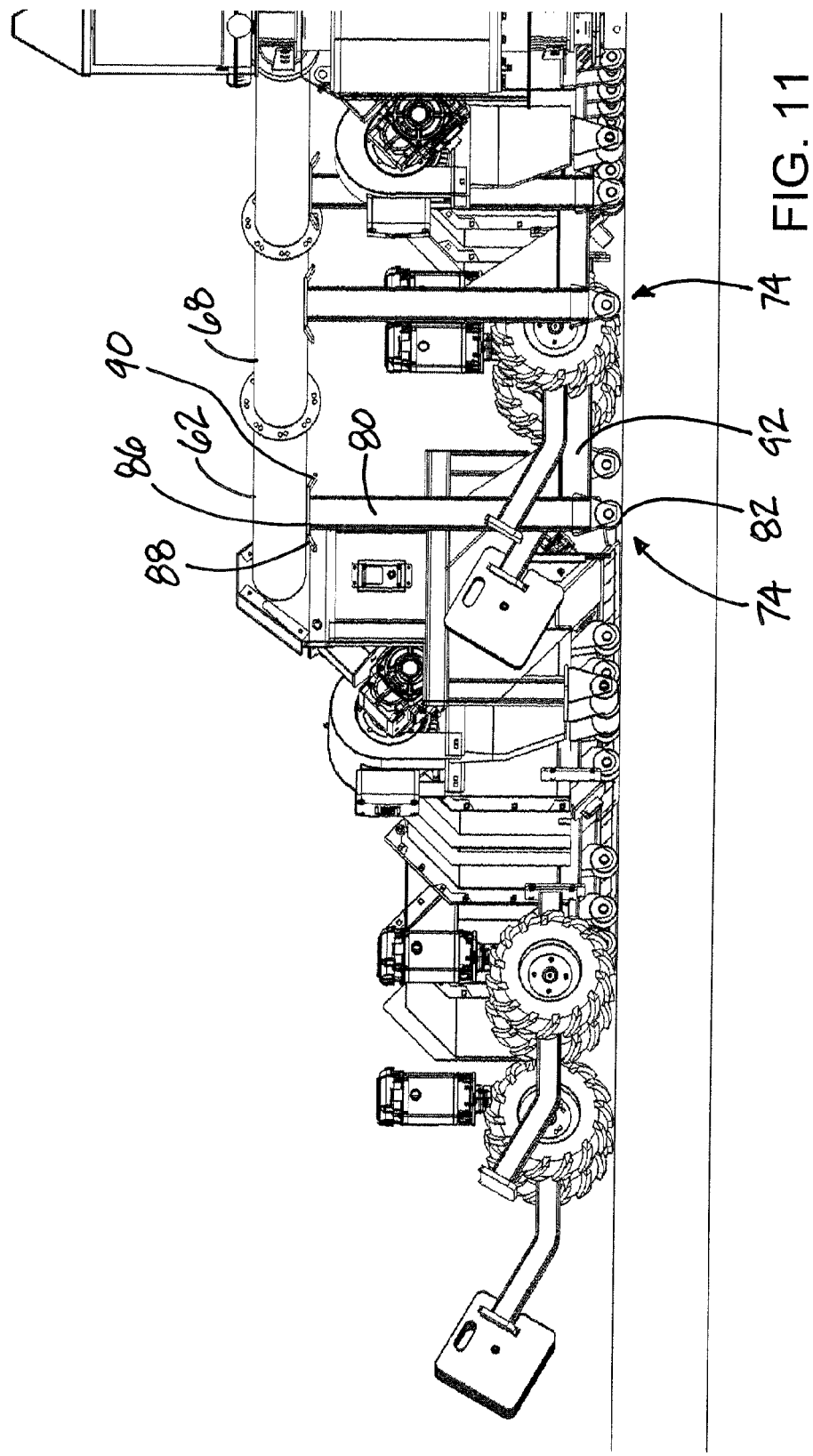

SEGMENTED BIN SWEEP SYSTEM

REFERENCE TO RELATED APPLICATIONS

This application claims the benefit of U.S. provisional patent application No. 62/060,101, filed Oct. 6, 2014; U.S. provisional patent application No. 62/086,287, filed Dec. 2, 2014; and U.S. provisional patent application No. 62/126,921, filed Mar. 2, 2015, all of which are hereby incorporated by reference in their entireties.

BACKGROUND

Field

The present disclosure relates to bin sweeps and more particularly pertains to a new segmented bin sweep system for facilitating clearing of more central regions of a storage bin prior to clearing more peripheral regions of the storage bin.

SUMMARY

In one aspect, the present disclosure relates to a bin sweep system for a bin having a floor surface and a central well. The system may comprise a center post defining a common center, and a sweep assembly configured to move across the floor surface of the bin and having an inboard end and an outboard end. The sweep assembly may comprise at least two sweep segments including a first sweep segment and a second sweep segment with the first sweep segment being located toward the inboard end and the second sweep segment being located toward the outboard end. At least one of the sweep segments may be movable about the center post substantially independently of another of the sweep segments.

In some embodiments, the first and second sweep segments may have an aligned condition characterized by a portion of a longitudinal axis of the first sweep segment and a portion of a longitudinal axis of the second sweep segment being substantially aligned. The first and second sweep segments may have an unaligned condition characterized by a portion of the longitudinal axis of the first sweep segment and a portion of the longitudinal axis of the second sweep segment not being aligned.

In another aspect, the disclosure relates to a bin sweep system for a bin having a floor surface and a central well. The system may comprise a center post defining a common center, and a sweep assembly configured to move across the floor surface of the bin and having an inboard end and an outboard end. The sweep assembly may comprise at least two sweep segments including a first sweep segment and a second sweep segment. Each of the sweep segments may have a particulate sweep structure including a plurality of paddles for moving the particulate material toward the center post. The first sweep segment may be located toward the inboard end and the second sweep segment being located toward the outboard end such that a space is formed between the second sweep segment and the center post and the first segment is movable between the second sweep segment and the center post. The first and second sweep segment may be rotatable about the center post substantially independently of each other.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 11 is a schematic angled side view of the first and second sweep segments of the illustrative segmented sweep system.

DETAILED DESCRIPTION

Figure 1A:
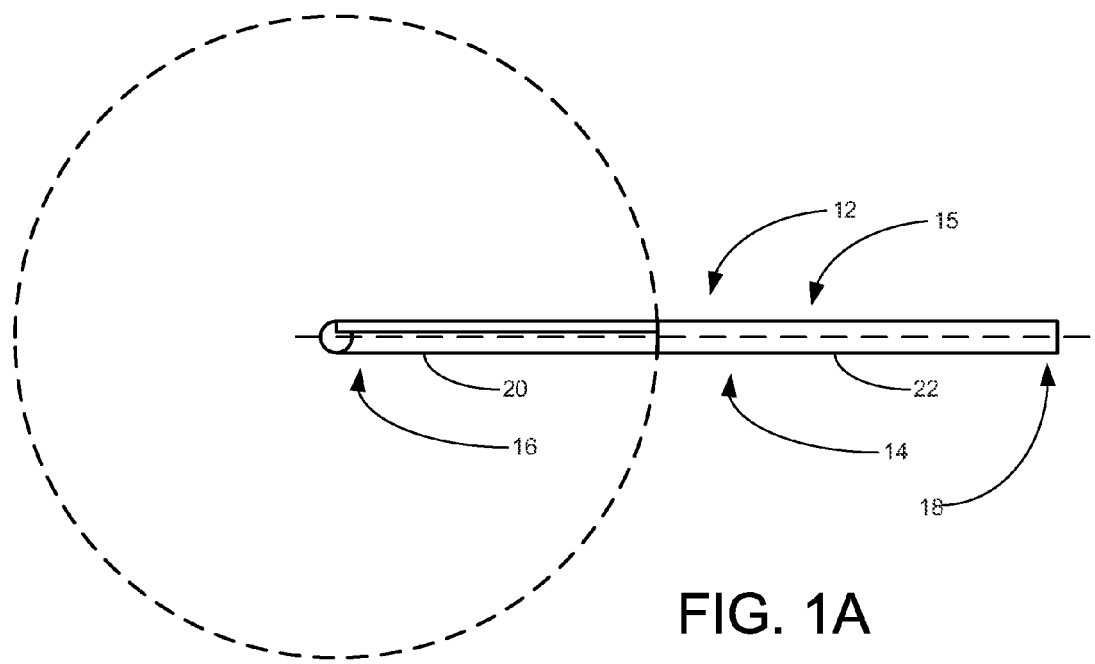
FIG. 1A is a schematic diagram of an embodiment of a new segmented bin sweep system according to the present disclosure, with the sweep segments in an aligned condition.
Figure 1B:
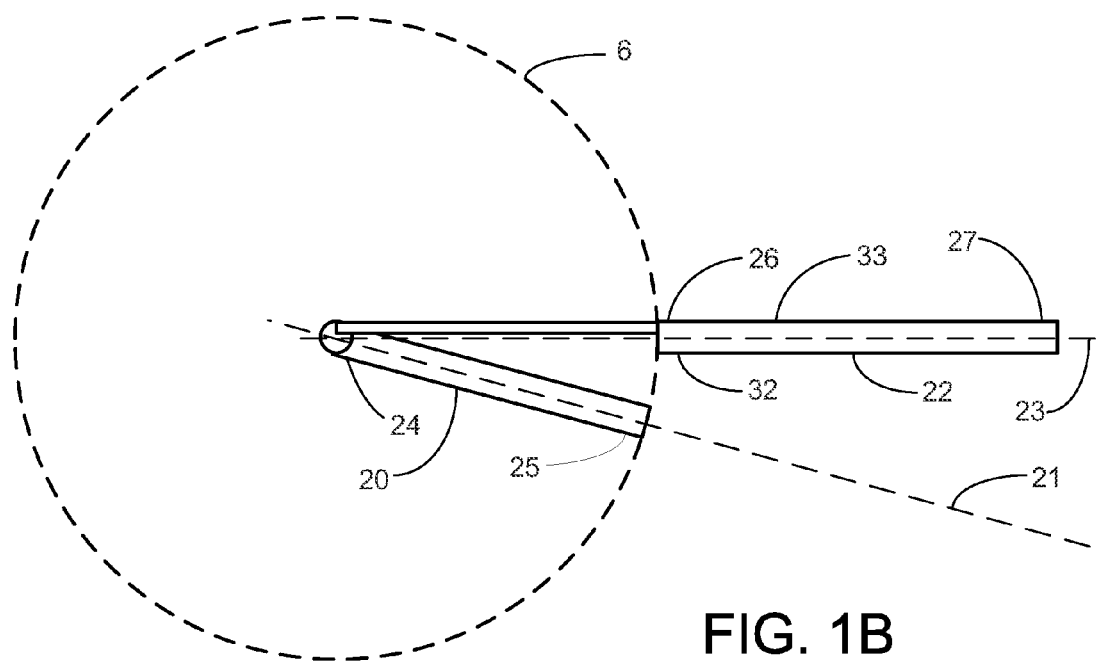
FIG. 1B is a schematic diagram of the embodiment of the segmented bin sweep system of FIG. 1A with the first sweep segment moved from the aligned condition into an unaligned condition with respect to the second sweep segment.
Figure 1C:
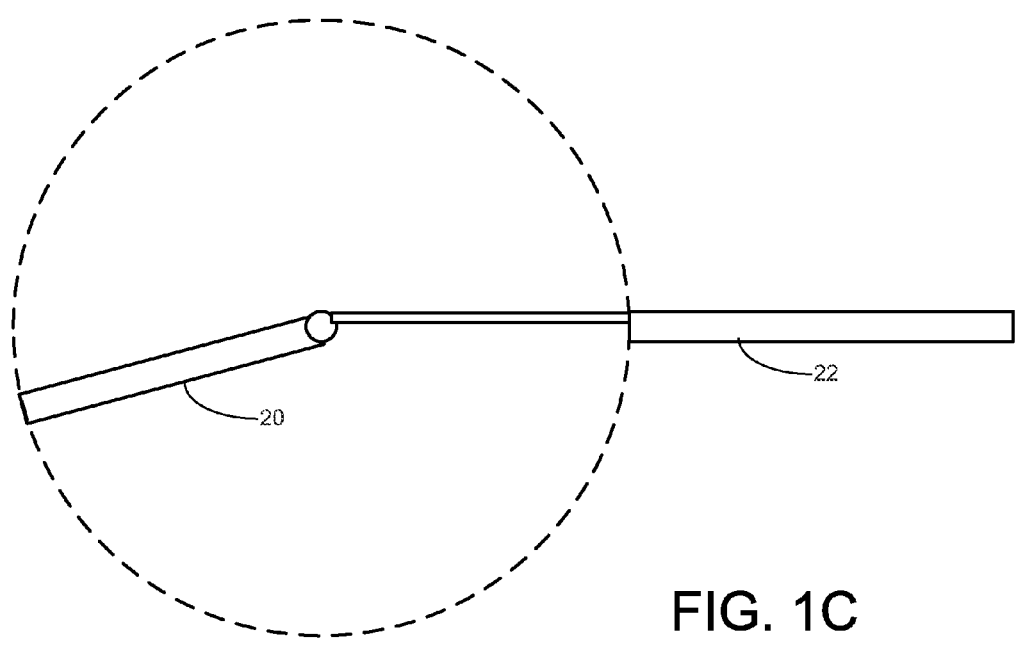
FIG. 1C is a schematic diagram of the segmented bin sweep system embodiment of FIG. 1 with the first sweep segment moved further from the aligned condition with respect to the second sweep segment.
Figure 1D:
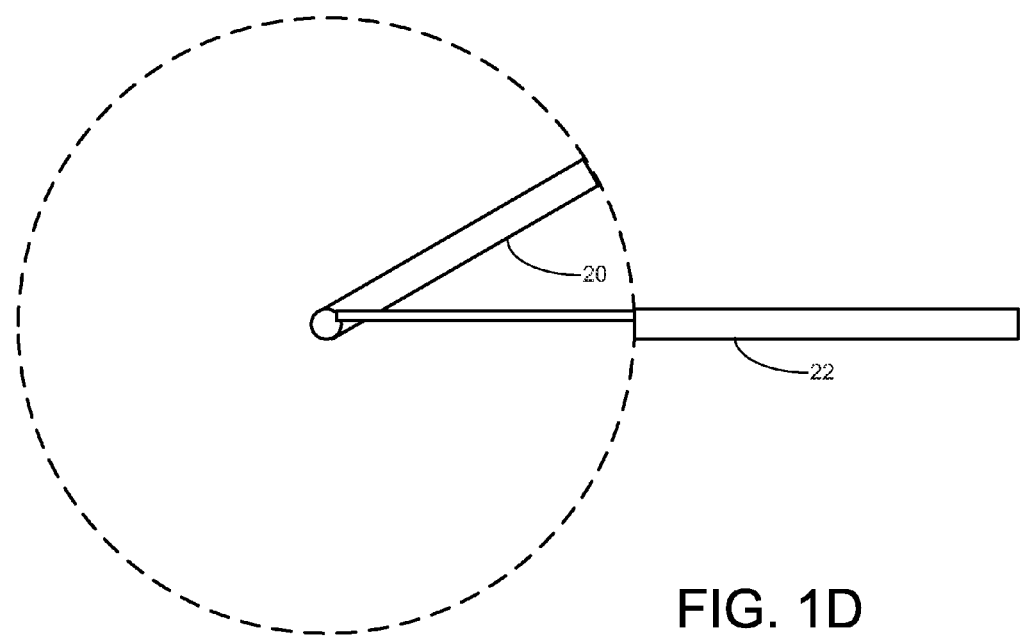
FIG. 1D is a schematic diagram of the segmented bin sweep system embodiment of FIG. 1 with the first sweep segment moved still further from the aligned condition with respect to the second sweep segment.
Figure 1E:
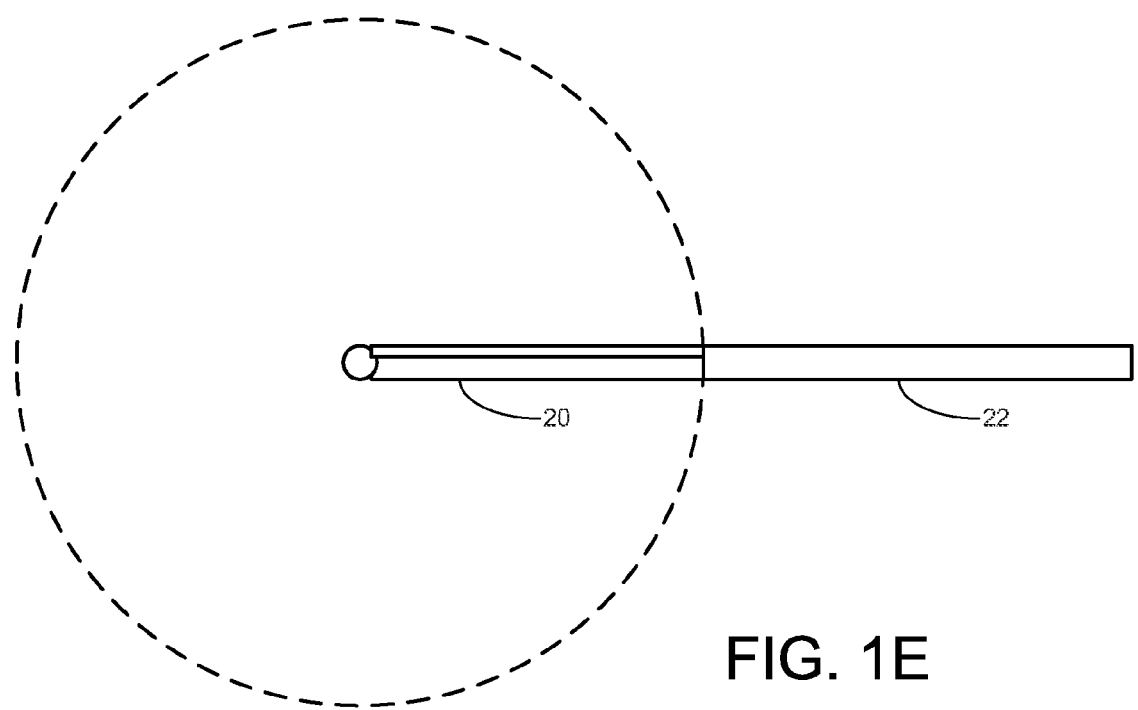
FIG. 1E is a schematic diagram of the segmented bin sweep system embodiment of FIG. 1 with the first sweep segment moved back into the aligned condition with respect to the second sweep segment.
Figure 1F:
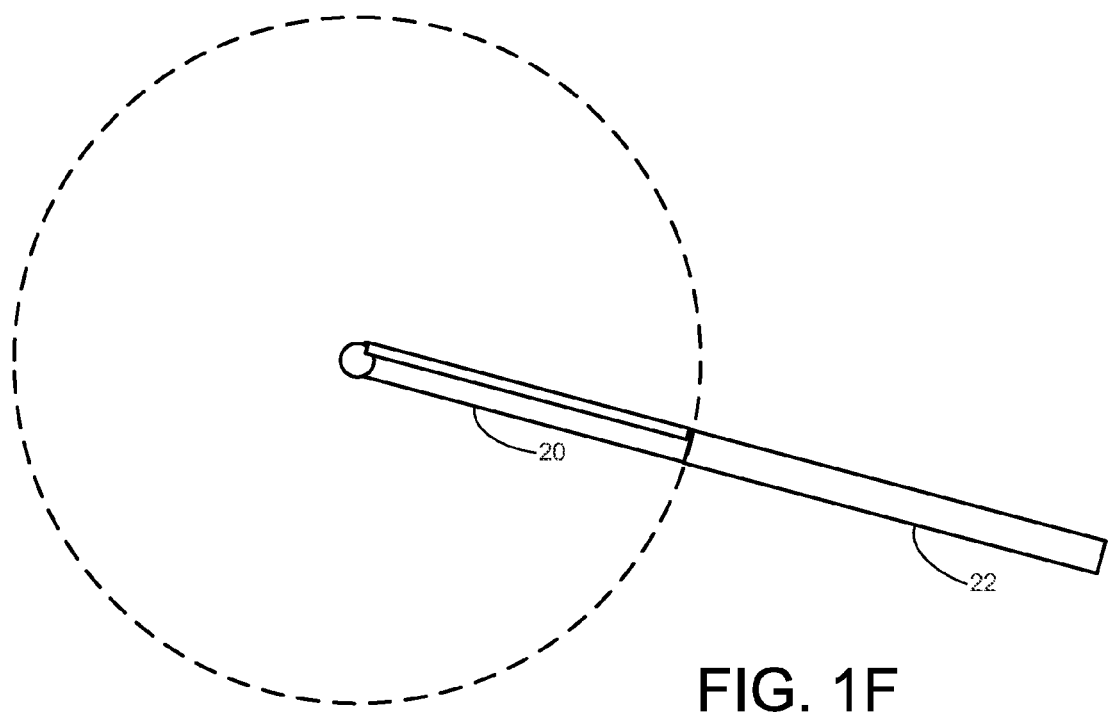
FIG. 1F is a schematic diagram of the segmented bin sweep system embodiment of FIG. 1 with the first sweep segment in the aligned condition with the second sweep segment and further rotated together from the position shown in FIG. 1E.
Figure 1G:
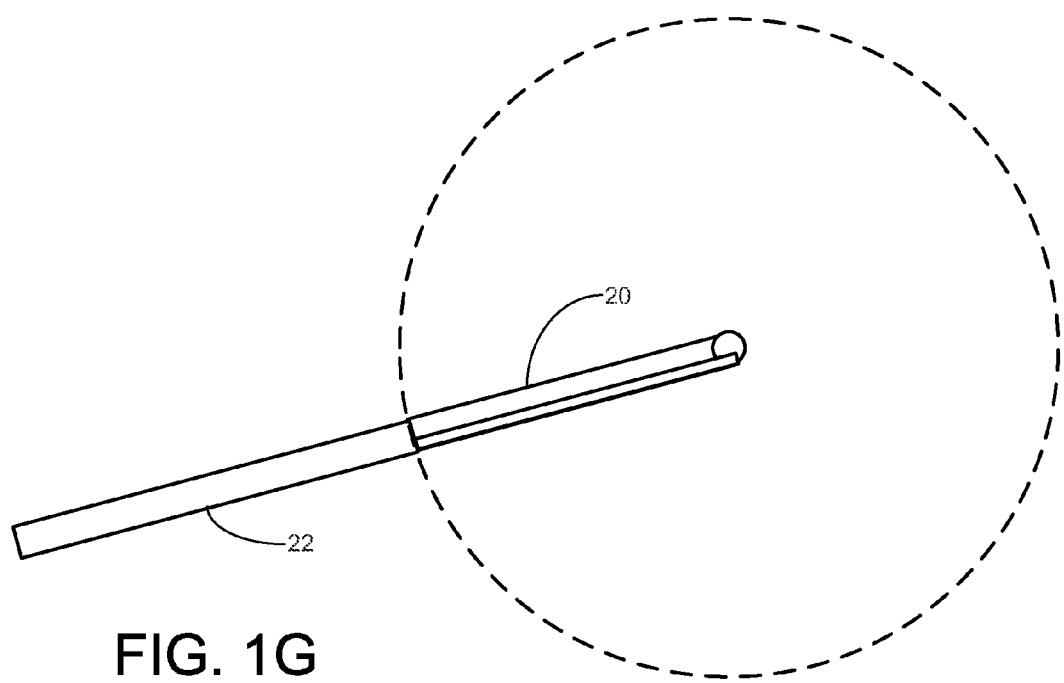
FIG. 1G is a schematic diagram of the segmented bin sweep system embodiment of FIG. 1 with the first and second sweep segments in the aligned condition still further rotated from the position shown in FIG. 1F.
Figure 1H:
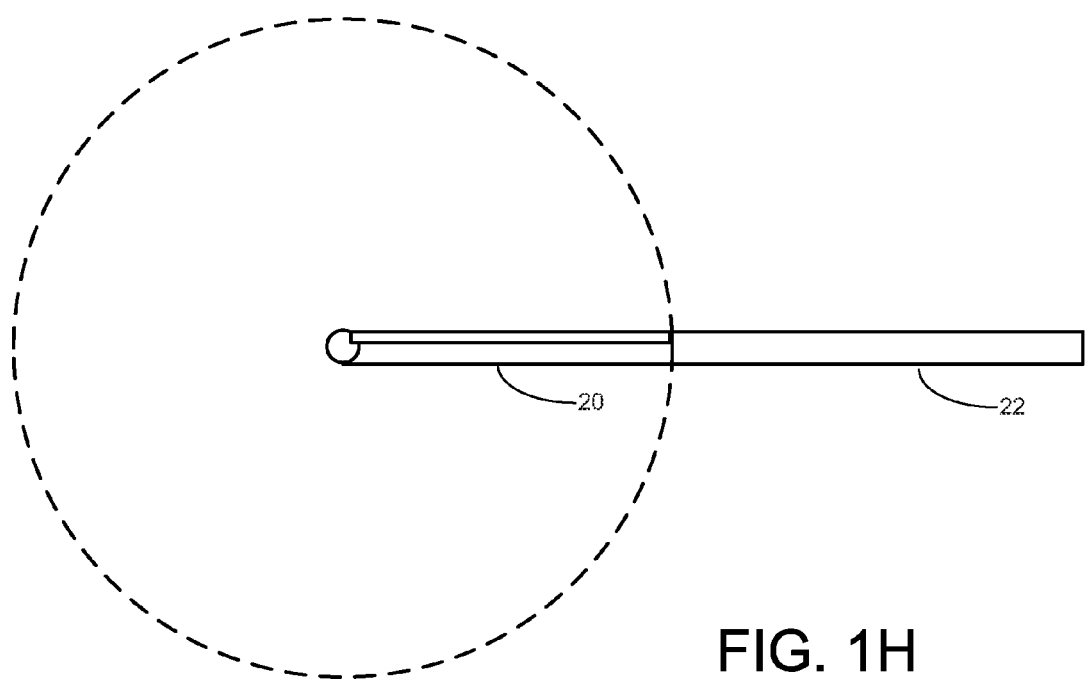
FIG. 1H is a schematic diagram of the segmented bin sweep system embodiment of FIG. 1 with the first and second sweep segments in the aligned condition yet further rotated from the position shown in FIG. 1G.
Figure 2A:
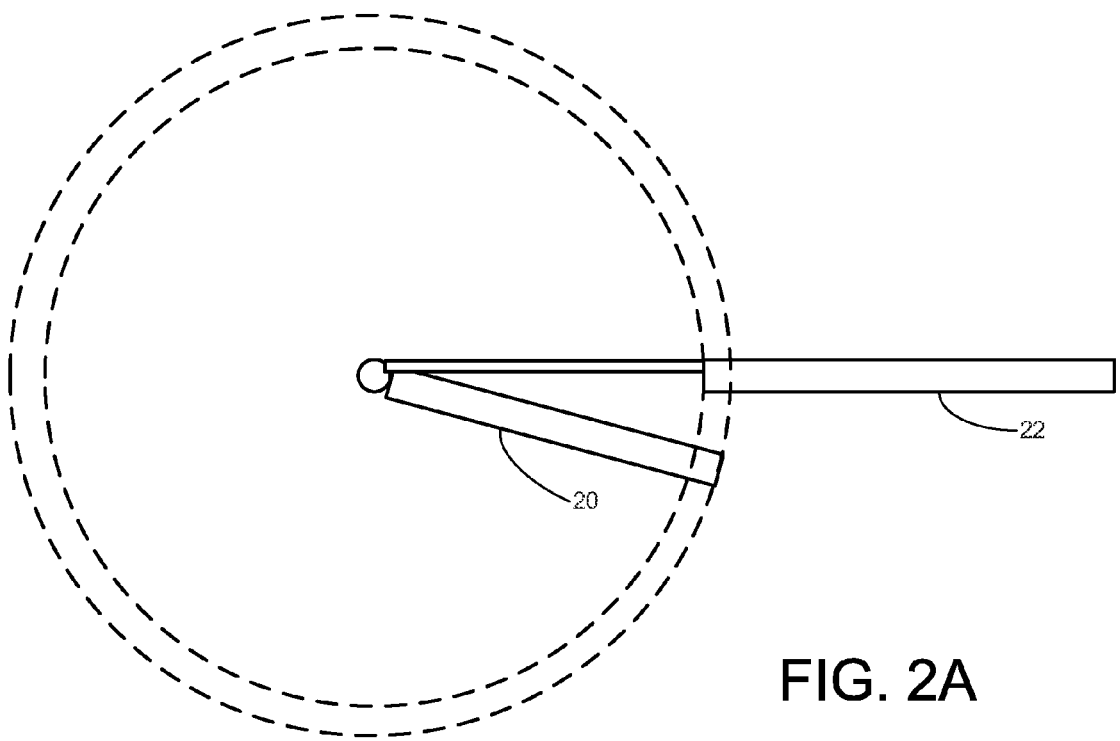
FIG. 2A is a schematic diagram of another embodiment of a segmented bin sweep system according to the present disclosure, with the sweep segments in an initial position.
Figure 2B:
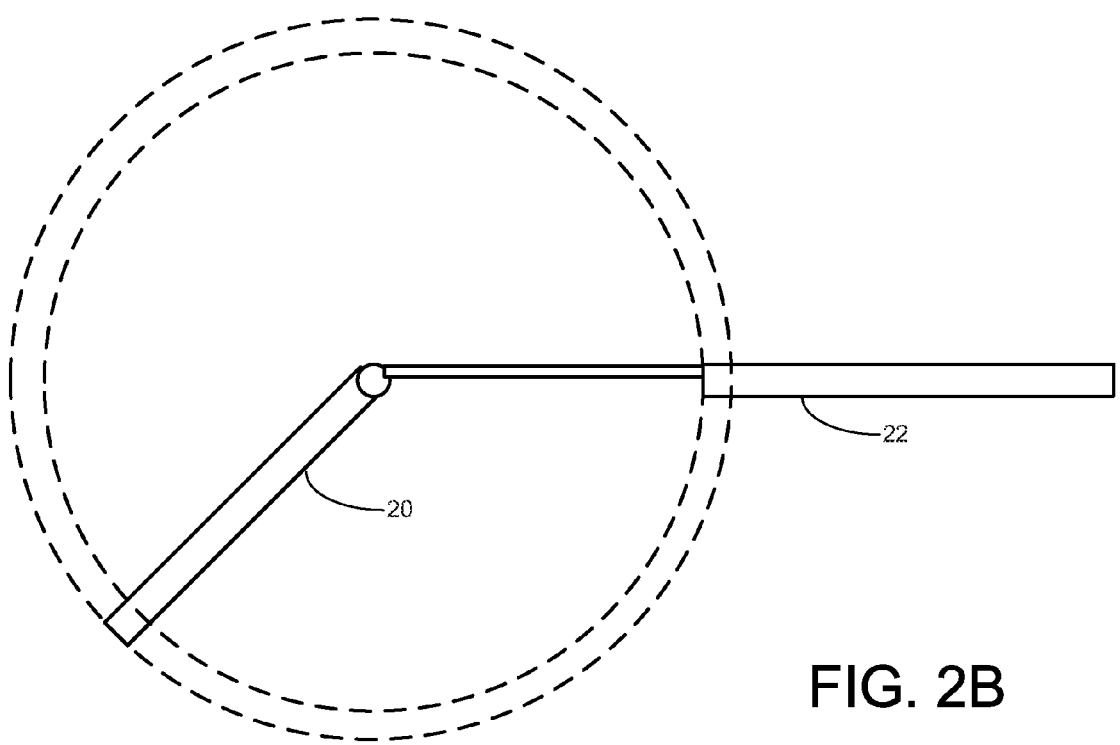
FIG. 2B is a schematic diagram of the embodiment of the segmented bin sweep system of FIG. 2A according to the present disclosure, with the first sweep segment moved from the initial position.
Figure 2C:
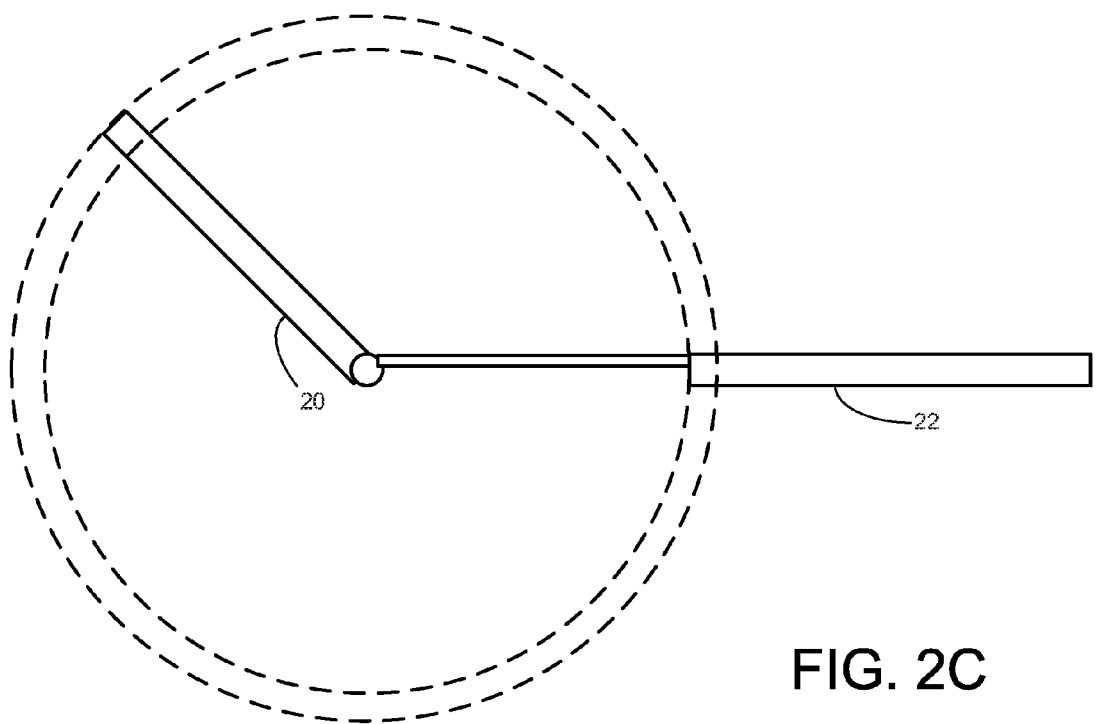
FIG. 2C is a schematic diagram of the embodiment of the segmented bin sweep system of FIG. 2A according to the present disclosure, with the first sweep segment further moved from the position in FIG. 2B.
Figure 2D:
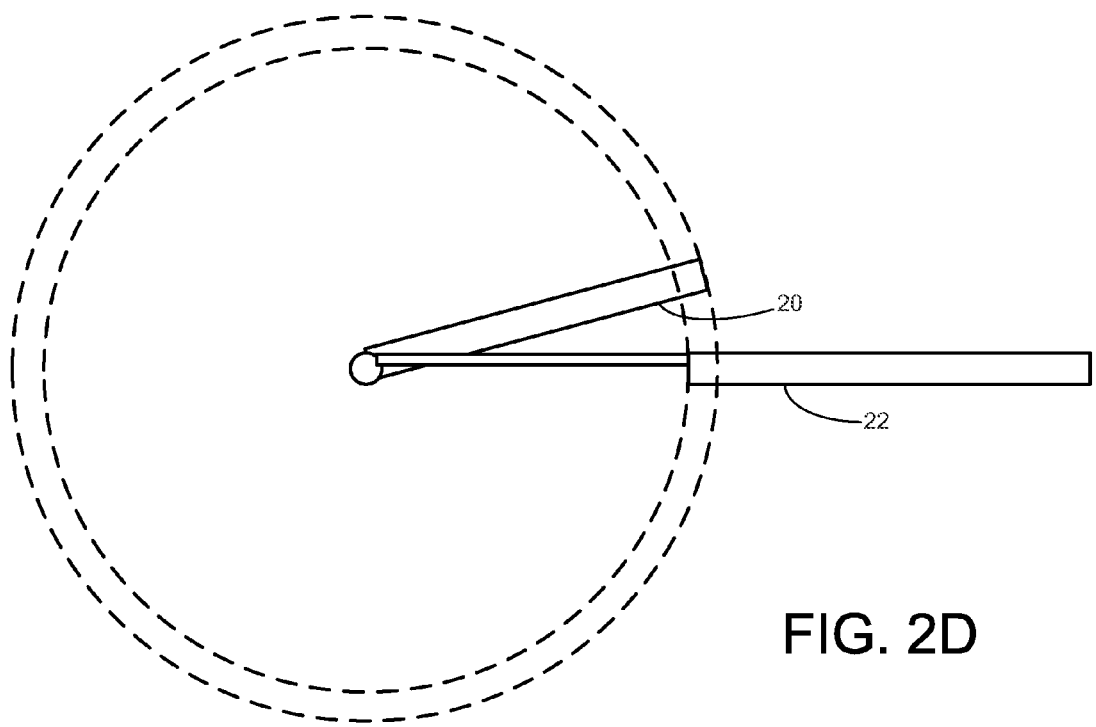
FIG. 2D is a schematic diagram of the embodiment of the segmented bin sweep system of FIG. 2A according to the present disclosure, with the first sweep segment still further moved from the position in FIG. 2C.
Figure 2E:
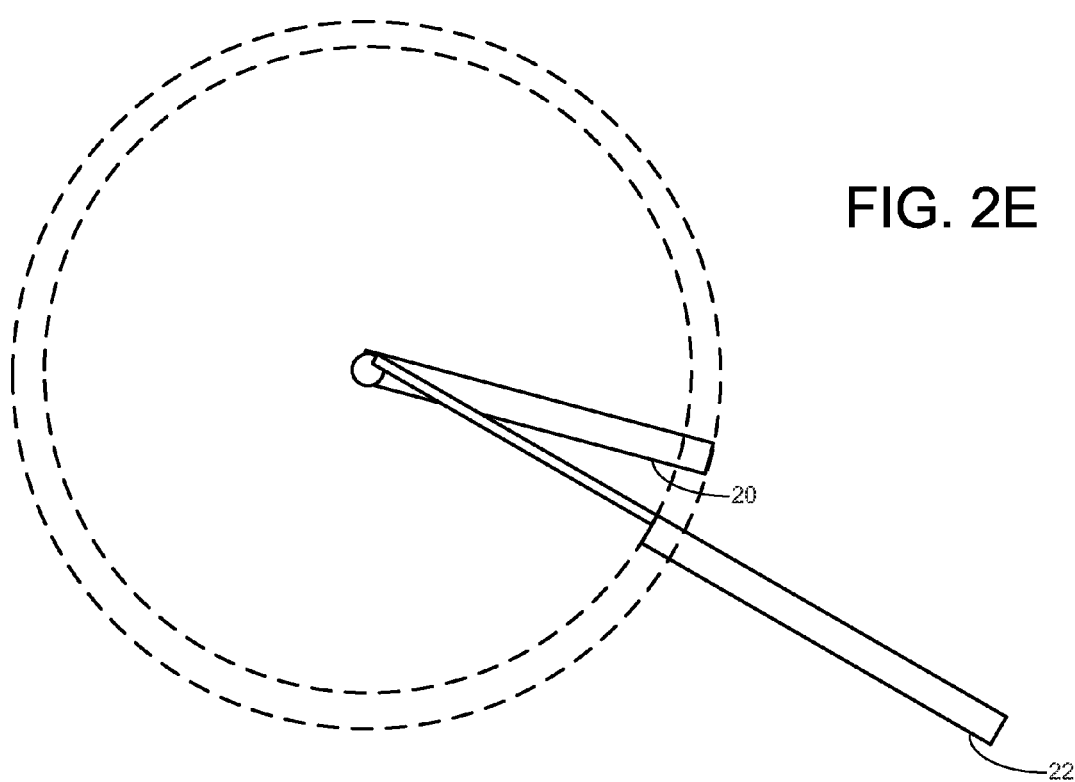
FIG. 2E is a schematic diagram of the embodiment of the segmented bin sweep system of FIG. 2A according to the present disclosure, with the first and second sweep segments moved from the position in FIG. 2D.
Figure 2F:
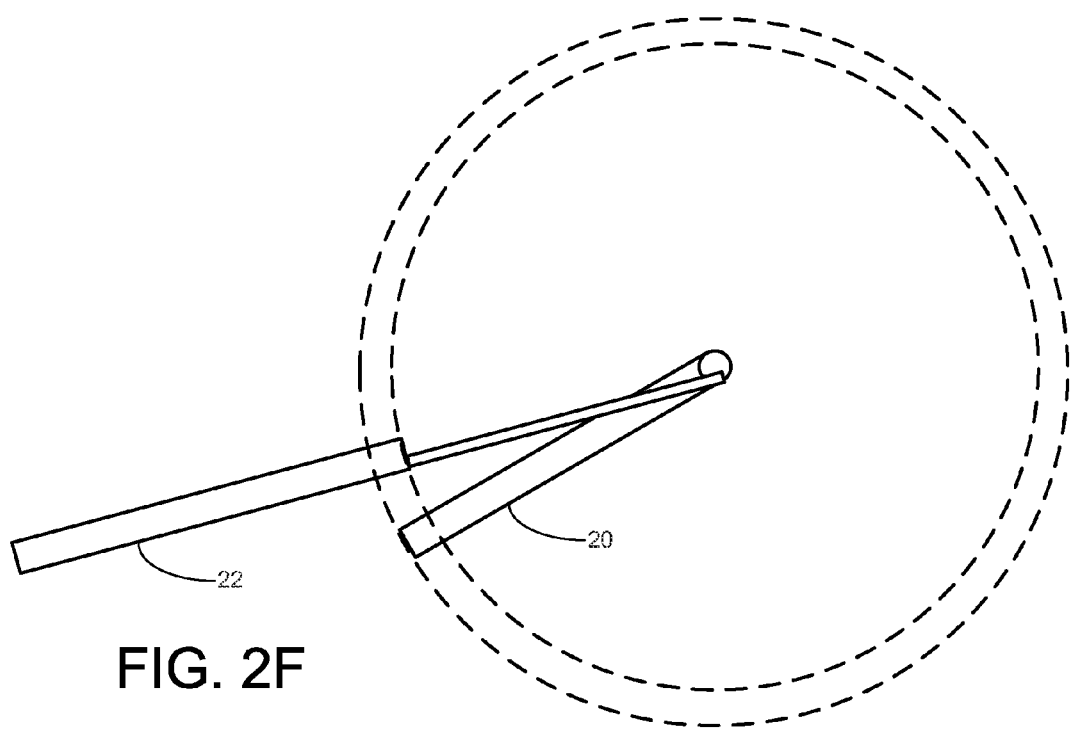
FIG. 2F is a schematic diagram of the embodiment of the segmented bin sweep system of FIG. 2A according to the present disclosure, with the first and second sweep segments further moved from the position in FIG. 2E.
Figure 2G:
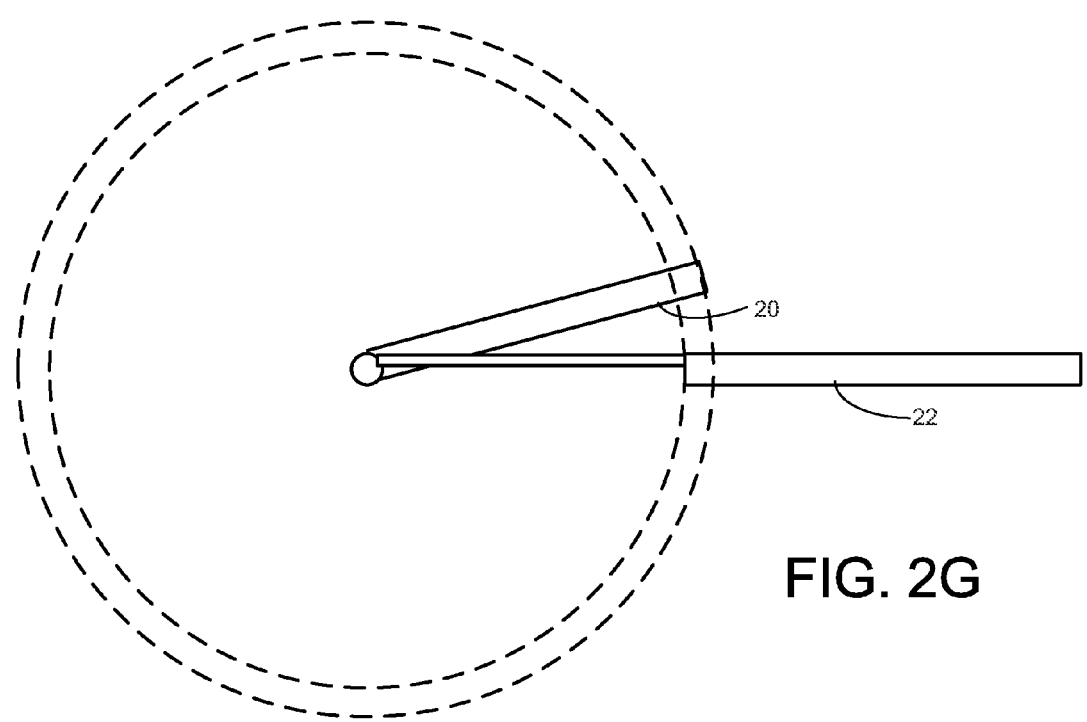
FIG. 2G is a schematic diagram of the embodiment of the segmented bin sweep system of FIG. 2A according to the present disclosure, with the first and second sweep segments still further moved from the position in FIG. 2F to the initial position.

With reference now to the drawings, and in particular to FIGS. 1 through 11 thereof, a new segmented bin sweep system embodying the principles and concepts of the disclosed subject matter will be described.

Applicants have recognized that bin sweep apparatus operating in a bin tend to remove the contents of the bin in an asymmetrical or unbalanced manner which tends to stress portions of the side walls of the bin unequally between the time that the sweep apparatus begins operation and the time that the bin is empty. Conventional bin sweeps may begin to remove the contents at one circumferential location in the bin, which lowers the load and stress on the bin wall at that circumferential location but leaves the side wall at a circumferential location opposite of the bin sweep location with the original load and resulting stress. The uneven loading that results from this type of bin clearing can distort the shape of the side wall of the bin, and in a few extreme cases may lead to the failure of the side wall of the bin. The unevenness of the loading of the side walls may be further exacerbated by the fact that a large portion of the grain particles are located toward the side walls when bin sweep operation begins. This concentration of the contents toward the side walls is a result of initially unloading the bin by drawing the grain particles through a central well in the bin floor which empties a significant amount of the grain through gravity-induced flow, leaving a pile of grain with an upper surface shaped like an inverted cone and the depth of the grain generally increasing from a minimum at the bin center to a maximum at the bin side wall. Thus the grain load remaining in the bin is concentrated at the side walls.

Applicants have devised a bin sweep system that in operation reduces the unevenness of the loading on the side walls of the bin by the contents. The system has the capability to remove grain particles from a central region of the bin interior, typically after a portion of the grain has been drawn out by gravity flow, by operating an inner bin sweep segment that moves grain from the central region toward the central well or sump (see, e.g., FIG. 6). The inner sweep segment may be operated for approximately one revolution about the center of the bin. An outer sweep segment may then be operated to remove grain particles from a peripheral region of the of the bin interior, and may be operated in concert with the inner sweep segment to carry the grain particles to the central sump.

In a general sense, the disclosure relates to a bin sweep system 10 which has embodiments highly suitable for use in a bin 1 having a floor surface 2 on which the system 10 is typically rested. The floor may be of any suitable character and may be formed such that the floor surface is substantially planar, but need not be perfectly so. The bin typically has a central sump or well 3 into which particulate matter, such as particles of grain, are moved by the system 10 for removal from the interior of bin by any suitable apparatus, but which usually employs a conveyor or auger beneath the floor surface that moves the particles from the central well to a location outside of a perimeter wall of the bin. One or more intermediate sumps 5 may extend generally along a line radiating from the central sump to the perimeter of the bin, and the line generally corresponds to the path of an in-floor auger tube 7 carrying particles from the central sump and the intermediate sumps to the exterior of the bin for unloading the bin. A center post 4 may be positioned adjacent to the central well, and may be located at approximately the geometric center of the bin floor, which often has a circular perimeter. The center post may extend upwardly from the floor surface of the bin, and in some installations may carry electrical and/or rotational mechanical power to transmit to the bin sweep for operating the sweep. For the purposes of this description, it should be recognized that the presence of a post is not critical to the system, and other structures may be employed that perform the functions of the center post described herein.

The system 10 may comprise a sweep assembly 12 that is configured to move in a forward direction across the floor surface 2 of the bin. The sweep assembly may have a front 14 for orienting toward the forward direction of movement of the sweep assembly and a rear 15 for orienting away from the forward direction of movement. The sweep assembly 12 may also have an inboard end 16 for positioning toward the central sump 3 of the bin and an outboard end 18 for positioning radially outwardly from the inboard end, and generally toward the perimeter wall of the bin. The sweep assembly 12 generally rotates about the center post 4 along a sweep path 6 that includes a plurality of positions in which the sweep assembly radiates outwardly from the center post. One position may comprise the park position, which may be characterized by the sweep assembly extending along and/or adjacent to the auger tube 7 and the central well 3 and intermediate sumps 5 of the bin.

The sweep assembly 12 may include at least two sweep segments 20, 22 which may be positioned between the inboard 16 and outboard 18 ends of the sweep assembly. While the following description is directed to the illustrative embodiments having two sweep segments, it should be understood that more than two segments may be employed using the principles disclosed herein. Illustratively, the sweep segments may include a first sweep segment 20 and a second sweep segment 22, with the first sweep segment being an inner sweep segment located toward the inboard end 16 and the second sweep segment being an outer sweep segment located toward the outboard end 18 of the sweep assembly. The first sweep segment 20 may have a first inner end 26 located toward the inboard end 16 of the sweep assembly and a first outer end 27 located toward the second sweep segment 22. The second sweep segment 22 may have a second inner end 26 located toward the first sweep segment 20 and a second outer end 27 located toward the outboard end 18 of the sweep assembly.

Each sweep segment 20, 22 of the sweep assembly 12 may comprise a housing 30, 31 that extends substantially the entire length of the sweep segment 20, 22, between the respective inner 24, 26 and outer 25, 27 ends. The housings 30, 31 each have a forward side 32 at the front 14 of sweep assembly which is oriented toward the forward direction of the sweep assembly, and a rearward side 33 at the rear 15 of the sweep assembly which is oriented away from the forward direction of the assembly 12. The housings 30, 31 may also define interiors that may be partially closed and partially open.

Figure 4:
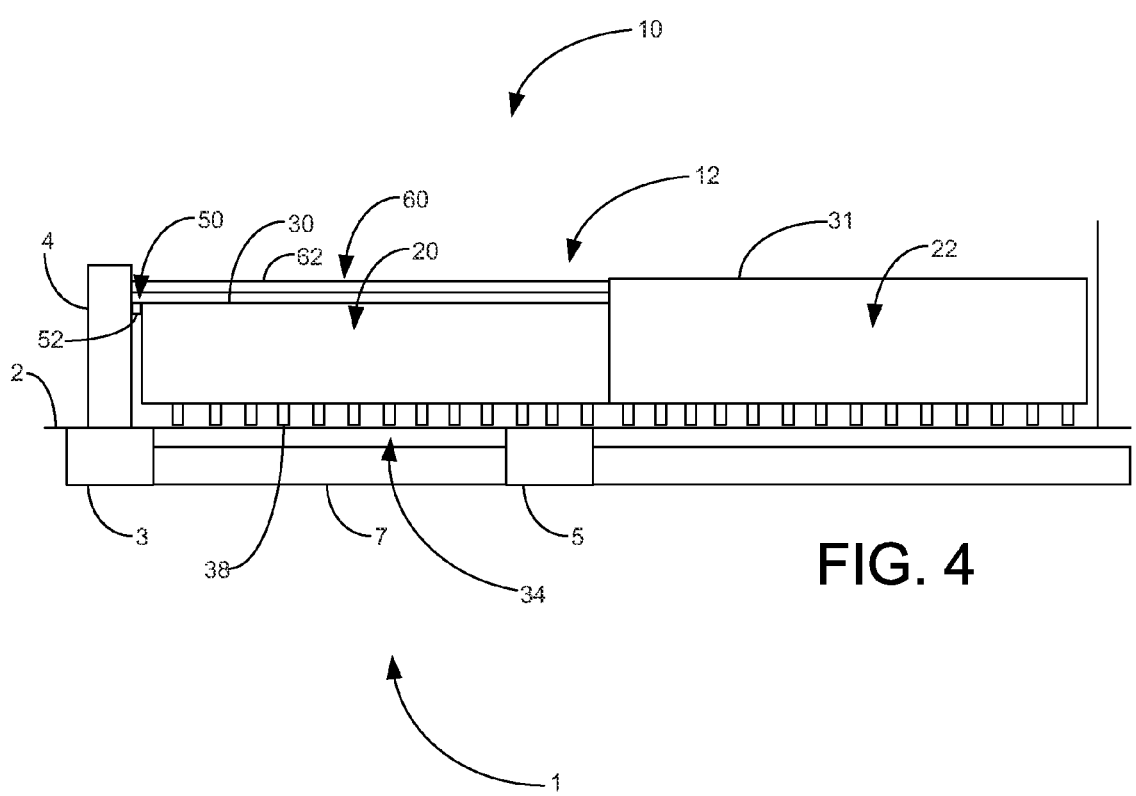
FIG. 4 is a schematic diagram in side view of an embodiment of the segmented sweep assembly.

Additionally, each sweep segment 20, 22 of the assembly 12 may also include a particulate sweep assembly 34, which may be any suitable means for moving particulate matter in the sweep along the length of the sweep segments, generally toward the center of the bin (see FIG. 4). In some illustrative embodiments, the particulate sweep assembly of each segment includes a plurality of interconnected paddles 38 movable in a succession on a path along at least a portion of the length of the sweep assembly between the inner 24, 26 ends and outer ends 25, 27 of the respective segments 20, 22. One suitable paddle system is disclosed in U.S. Pat. No. 6,499,930 to Carl Dixon, which is hereby incorporated by reference in its entirety. Other useful aspects, including a tilted paddle orientation, are disclosed in our U.S. provisional patent application No. 62/126,921, filed Mar. 2, 2015. In such systems, the plurality of paddles 38 may be arrayed in an endless loop extending between the inboard and outboard ends of the sweep assembly. The plurality of paddles 38 may be mounted on an endless loop member at spaced locations along the endless loop. In some embodiments, the endless loop member may comprise a series of interconnected links, which may comprise a plurality of chain links. Each of the paddles 38 may have a perimeter edge with a lower edge portion that is positioned close to or in contact with the floor surface of the bin, and movement of the paddles tends to push the particles located in front of the respective paddles. The endless loop may include an inbound extent generally moving toward the inner end 24, 26 of the respective sweep segment and an outbound extent generally moving toward the outer end 25, 27 of the respective segment. The inbound extent may contact particles to move the particles toward the inner end of the respective segment, and the outbound extent may be out of contact with the particles until reaching the outer end of the respective segment. In some embodiments, at least a portion of the endless loop of the plurality of paddles may be positioned in the interior of the housing. In some embodiments the endless loop may generally rotate about horizontally-oriented axes, with the inbound extent being a lower extent of the endless loop and the outbound extent being an upper extent of the endless loop, and in other embodiments the endless loop may generally rotate about vertically-oriented axes with the inbound extent being a relatively forward extent and the outbound extent being a relatively rearward extent. It should be recognized that other suitable particulate sweep structures may be employed, such as, for example, augur-based assemblies.

Each of the sweep segments 20, 22 may also include a sweep drive assembly that may be mounted on the respective housing and configured to move the housing of the segment across the floor surface. The sweep drive assembly may be located toward the outer end of the respective sweep segment, although this is not critical. The sweep drive assembly may include one or more wheels, and in at least some embodiments, the sweep drive assembly may be driven by movement of the particulate sweep assembly 34, such as the endless loop. The referenced Dixon patent shows a suitable drive system, although other suitable drive systems may be employed.

The first sweep segment 20 may be movable about the center post 4 substantially independently of the second sweep segment 22, which is also movable about the center post. The first and second sweep segments may have an aligned condition (see, e.g., FIG. 1A) which is characterized by a portion of the longitudinal axis 21 of the first sweep segment 20 and a portion of the of the longitudinal axis 23 of the second sweep segment 22 being substantially parallel, and may be substantially collinear. The first 20 and second 22 sweep segments may also have an unaligned condition (see, e.g., FIG. 1B) which is characterized by a portion of the longitudinal axis 21 of the first sweep segment and a portion of the longitudinal axis 23 of the second sweep segment not being substantially parallel or collinear, and being displaced from each other at an angle. The unaligned condition may occur in a variety of positions of the sweep segments about the center post 4.

In some embodiments of the system 10, such as are illustratively shown in FIGS. 1A through 1H, the sweep segments may start in an initial position, which may be the park position which is suitable for parking the sweep assembly for periods of time when the bin is empty, being filled with grain particles or is at least partially filled with the particles (see FIG. 1A). Upon beginning operation, the first sweep segment 20 may begin to be rotated with respect to the center of the bin while the second sweep segment remains substantially stationary at the initial position (see FIG. 1B). Rotation of the first sweep segment may continue (see FIGS. 1C and 1D) as the sweep segment removes gain particles from the central region of the bin interior. The first sweep segments may move into an aligned position with the second sweep segment, such as at the initial position (see FIG. 1E). The first 20 and second 22 sweep segments may move in concert with each other, and may move in alignment with each other (see FIGS. 1F and 1G), to move grain particles from the peripheral region as well as any grain left in the central region of the bin interior. The first and second sweep segments may continue until the sweeps return back to the initial position (see FIG. 1H).

In some embodiments of the system 10, such as are illustratively shown in FIGS. 2A through 2G, the first sweep segment 20 may have a configuration in which the sweep area of the first sweep segment overlaps a portion of the sweep area of the second sweep segment, and the longitudinal axis of the first sweep segment may be unable to align completely with the longitudinal axis of the second sweep segment. In such embodiments, the first sweep segment 20 may have an initial position ahead of the second weeps segment 22 (see FIG. 2A) and may initially rotate about the center while the second sweep segment remains in an initial position (see FIG. 2B). The first sweep segment 20 may continue to rotate about the center (see FIG. 2C) until the first sweep segment moves adjacent to the second sweep segment (see FIG. 2D). The second sweep segment 22 may start movement forward of the first sweep segment, with the first sweep segment following the second sweep segment (see FIGS. 2E and 2F) as the segments move in concert with each other. The movement of the first and second sweep segments may continue until, for example, the second sweep segment returns to its initial position. As a final step, the first sweep segment may be rotated backward with respect to the second sweep segment to return the first sweep segment to its initial position (see FIG. 2A).

In some embodiments of the system 10, such as are illustratively shown in FIGS. 3A through 3I, the first sweep segment may further be configured to shift radially outwardly and inwardly with respect to the center post, such as between a home condition (see, e.g., FIGS. 3A, 3B, 3H and 3I) that is relatively closer to the center post and a shifted condition (see, e.g., FIGS. 3C through 3G) that is radially displaced from the home condition in an outward direction. The first sweep segment 20 may be rotatable with respect to the center post 4 in the home condition and the shifted condition. The first sweep segment 20 may be capable of shifting radially outward to the shifted condition when the first and second sweep segments are in the unaligned condition (or not in the aligned condition). In some embodiments, the first sweep segment may be prevented or blocked from shifting to the shifted condition by the presence of the second sweep segment when the segments 20, 22 are the aligned condition (and not in the unaligned condition). The shifting of the first sweep segment from the home to the condition to the shifted condition may produce an annular area of the bin floor which may be swept by both the first and second sweep segments as the segments rotate about the center due to the overlap in the areas swept by the segments. An overlapping area of sweep by the segments may be advantageous in that the first outer end 25 of the first sweep segment 20 may be better positioned to engage particles brought inward by the second sweep segment 22 to the second inner end 26 of the segment 22.

Figure 3A:
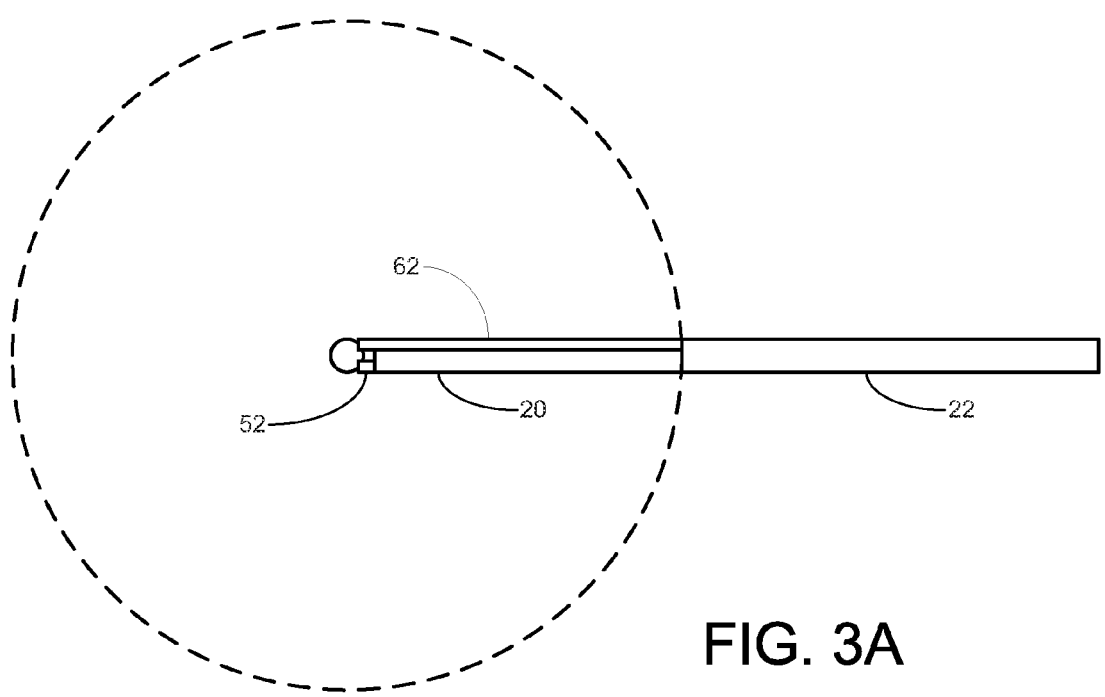
FIG. 3A is a schematic diagram of another embodiment of a segmented bin sweep system according to the present disclosure, with the sweep segments in an aligned condition.
Figure 3B:
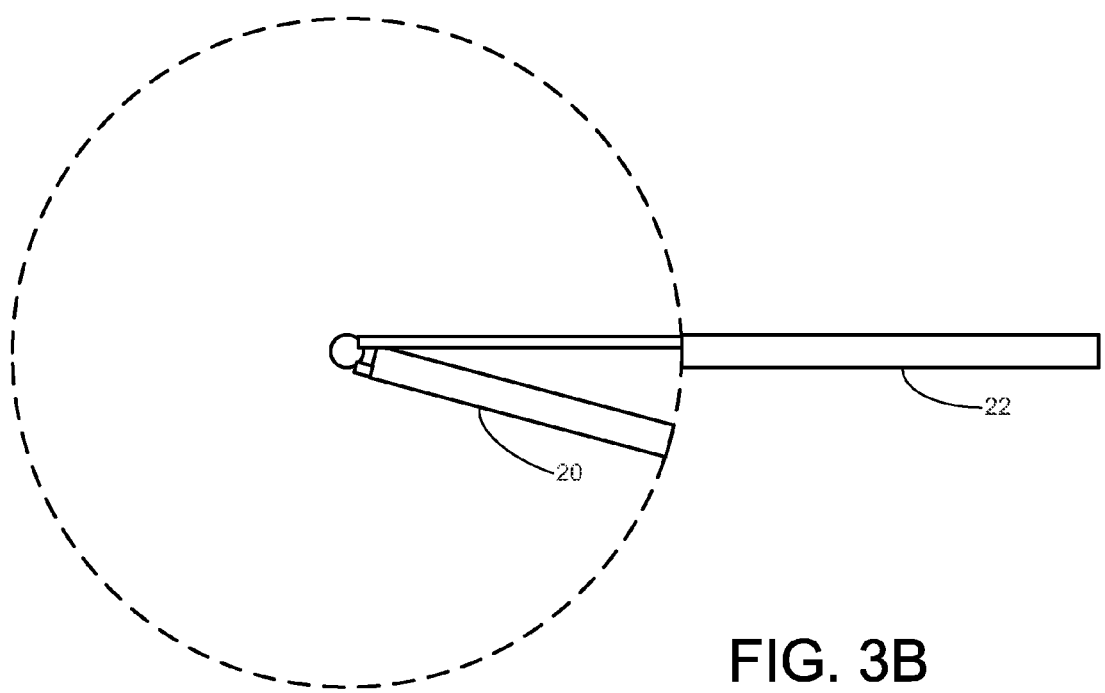
FIG. 3B is a schematic diagram of the embodiment of the segmented bin sweep system of FIG. 3A with the first sweep segment moved from the aligned condition into an unaligned condition with respect to the second sweep segment and in a home condition with respect to the center.
Figure 3C:
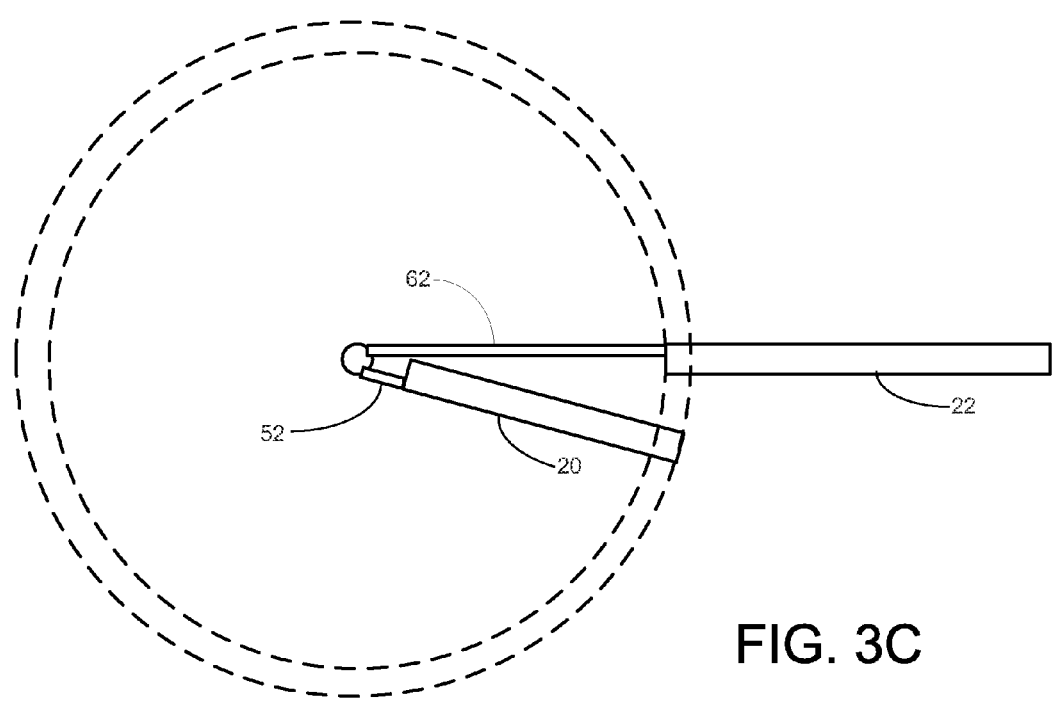
FIG. 3C is a schematic diagram of the embodiment of the segmented bin sweep system of FIG. 3A with the first sweep segment moved from the aligned condition into an unaligned condition with respect to the second sweep segment, and further moved into a shifted condition with respect to the center.
Figure 3D:
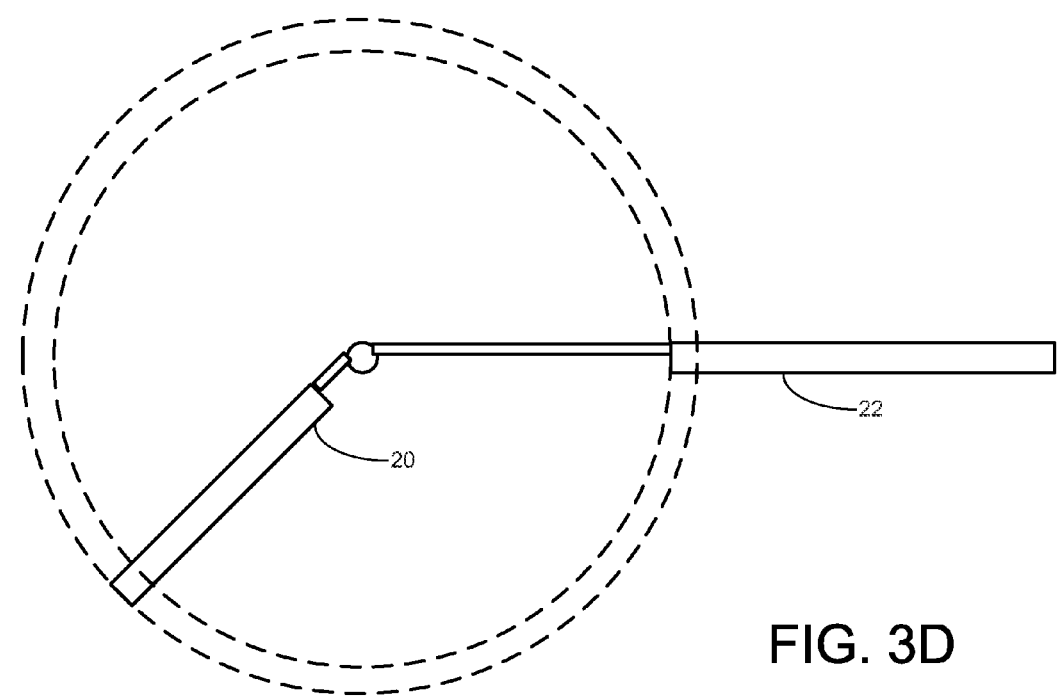
FIG. 3D is a schematic diagram of the embodiment of the segmented bin sweep system of FIG. 3A with the first sweep segment further moved from the unaligned condition of FIG. 3C with the first sweep segment in the shifted condition.
Figure 3E:
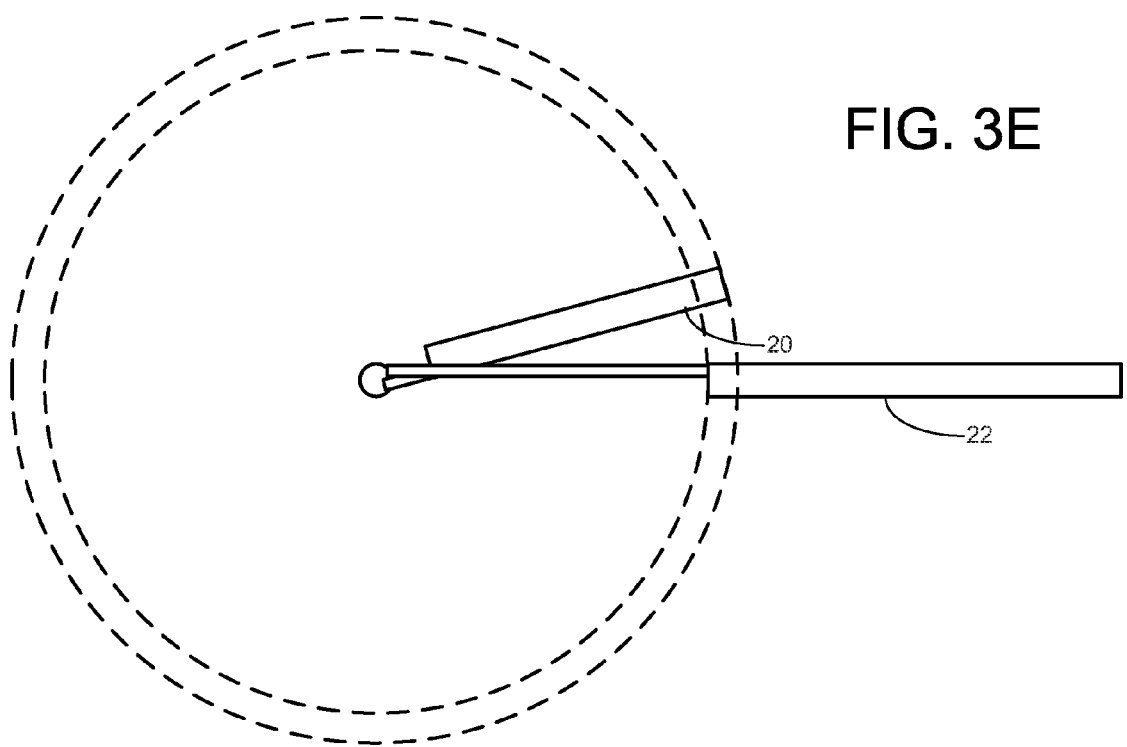
FIG. 3E is a schematic diagram of the embodiment of the segmented bin sweep system of FIG. 3A with the first sweep segment further moved from the unaligned condition of FIG. 3D with the first sweep segment in the shifted condition.
Figure 3F:
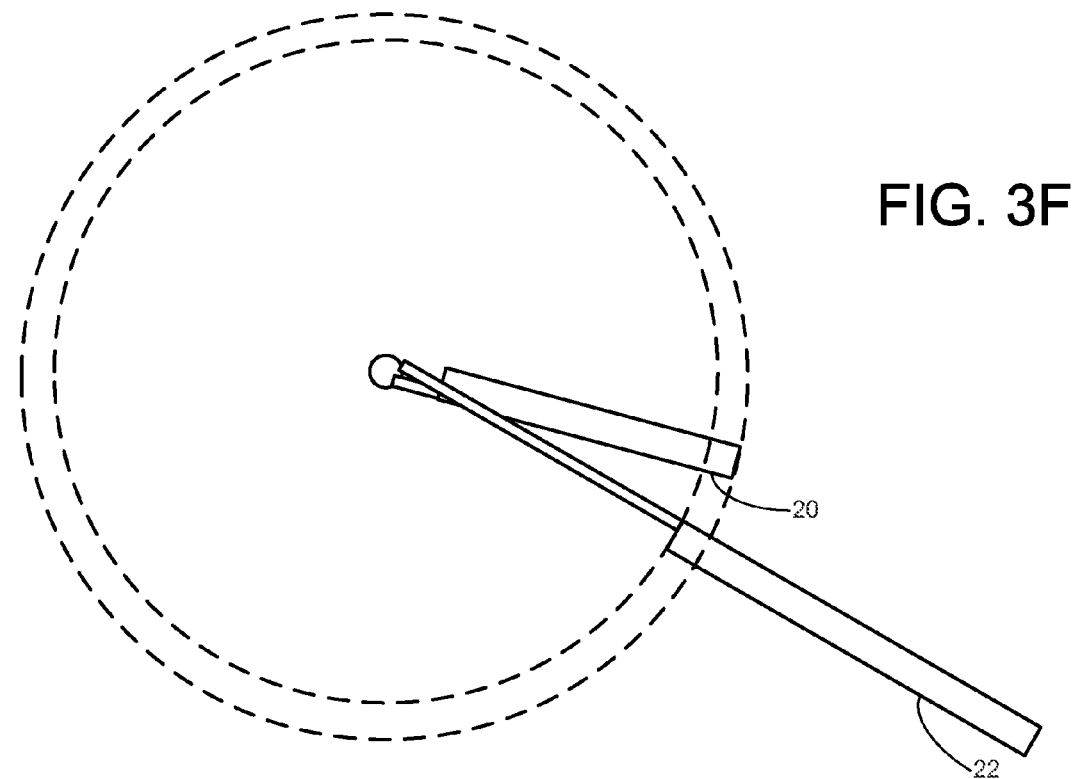
FIG. 3F is a schematic diagram of the embodiment of the segmented bin sweep system of FIG. 3A with the first and second sweep segments moved from the position of FIG. 3E with the first sweep segment in the shifted condition.
Figure 3G:
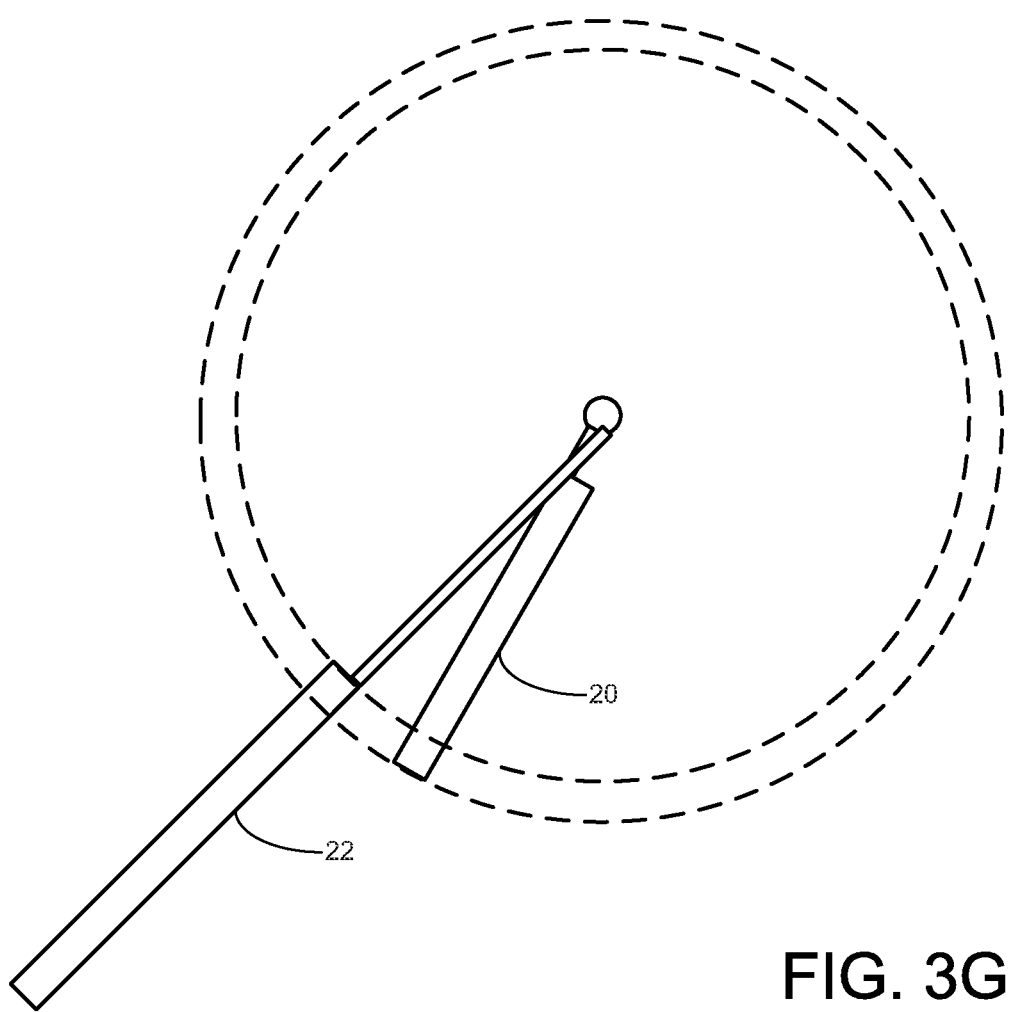
FIG. 3G is a schematic diagram of the embodiment of the segmented bin sweep system of FIG. 3A with the first and second sweep segments further moved from the position of FIG. 3F with the first sweep segment in the shifted condition.
Figure 3H:
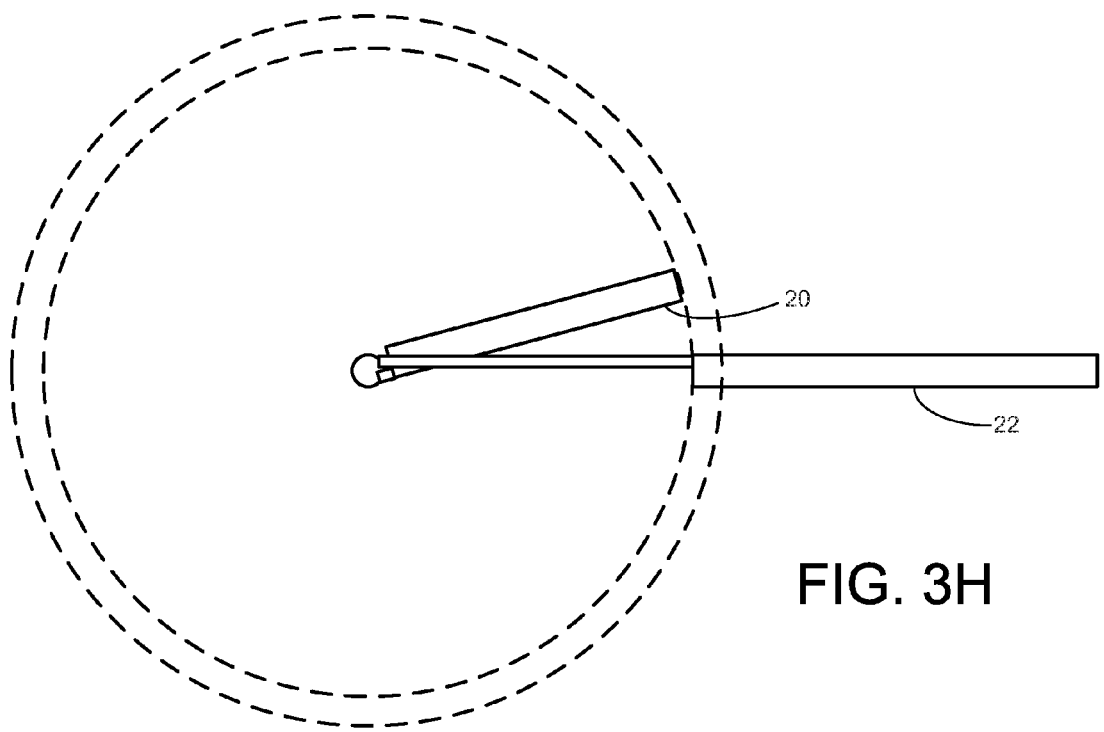
FIG. 3H is a schematic diagram of the embodiment of the segmented bin sweep system of FIG. 3A with the first and second sweep segments further moved from the position of FIG. 3G with the first sweep segment in the home condition.
Figure 3I:
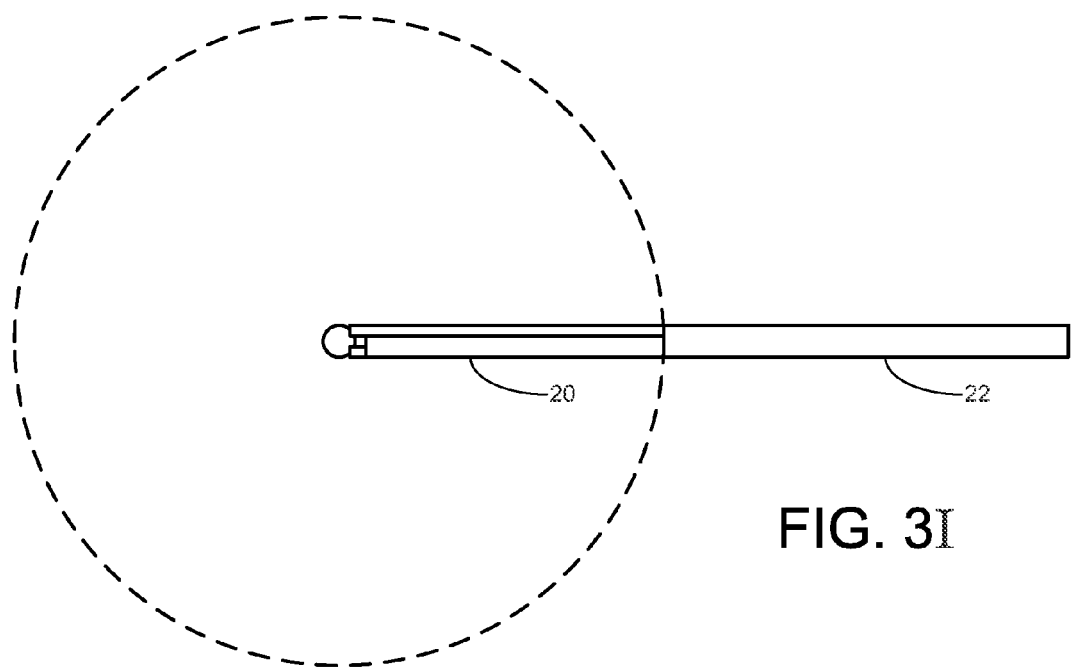
FIG. 3I is a schematic diagram of the embodiment of the segmented bin sweep system of FIG. 3A with the first and second sweep segments moved into the aligned condition with the first sweep segment in the home condition.

The first and second sweep segments may begin in an initial position (see FIG. 3A), and the first sweep segment may begin to rotate while the second sweep segment remains relatively stationary (see FIG. 3B). The first sweep segment, such as when it is moved out of alignment with the second sweep segment, may be moved or shifted radially outward (see FIG. 3C). Optionally, during a first revolution about the center, the first sweep segment may remain at a radially inward position and not be shifted outwardly from the center. The first sweep segment may be moved or rotated away from the initial position (see FIG. 3D) until the first sweep segment approaches the initial position where second sweep segment may be located. If the first sweep segment was not previously shifted radially outward, then the first sweep segment may be moved outwardly prior to movement with the second sweep segment. The first and second sweep segments may move in concert with each other, with the second sweep segment leading the first sweep segment (see FIGS. 3F and 3G). A small annular band of overlap of the paths of the sweep segments may be created, which may be beneficial for the effectiveness of the first sweep segment for catching the grain particles moved by the second sweep segment. Upon substantially completing a revolution about the center, and the second sweep segment substantially reaches the initial position, then the first sweep segment may be moved radially inward (see FIG. 3H) and moved back into alignment with the second sweep segment (see FIG. 3I), although this is not critical.

Figure 5:
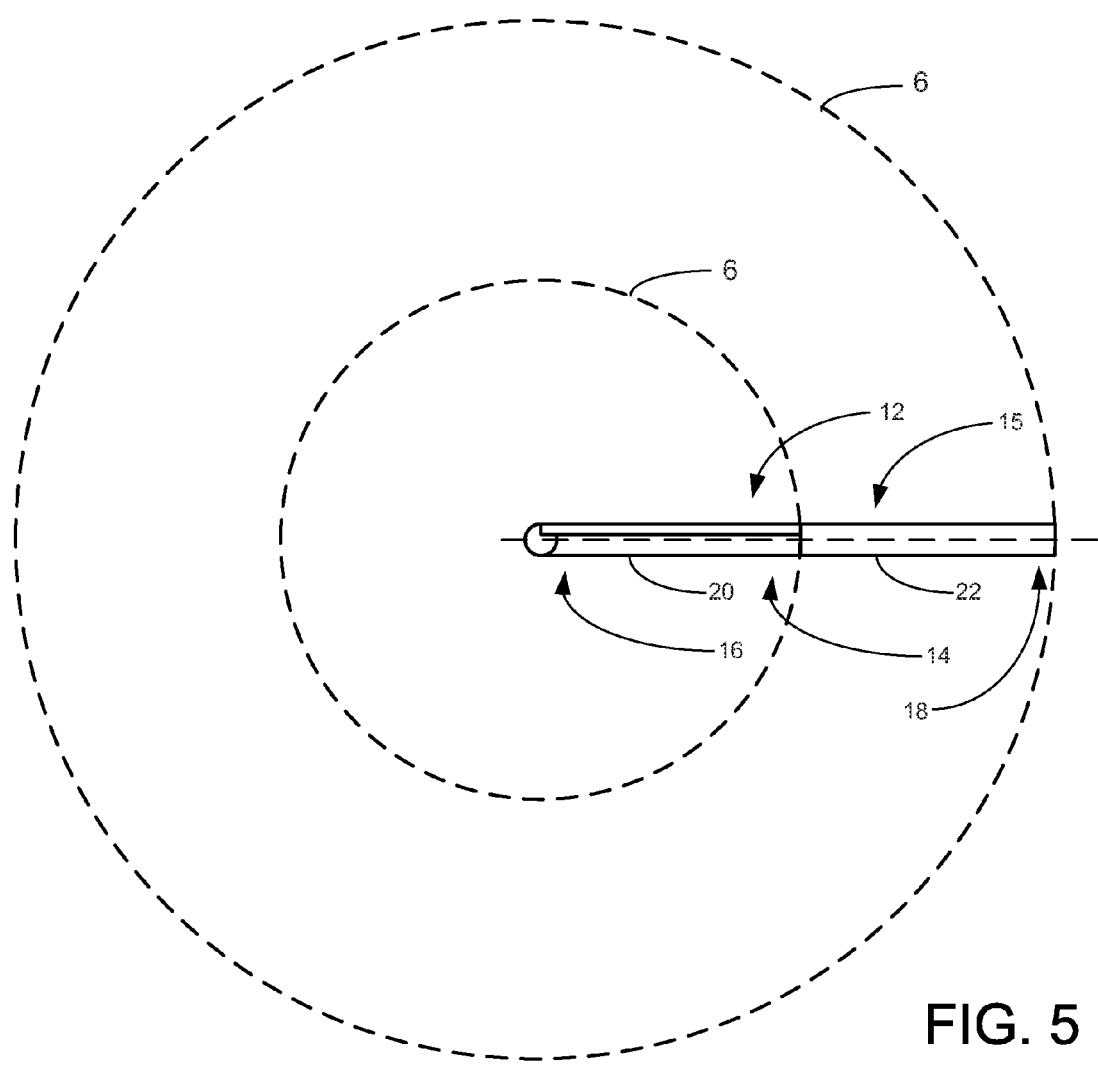
FIG. 5 is a schematic diagram of a top view of the system showing the respective paths traveled, and regions cleared, by the sweep segments.
Figure 6:
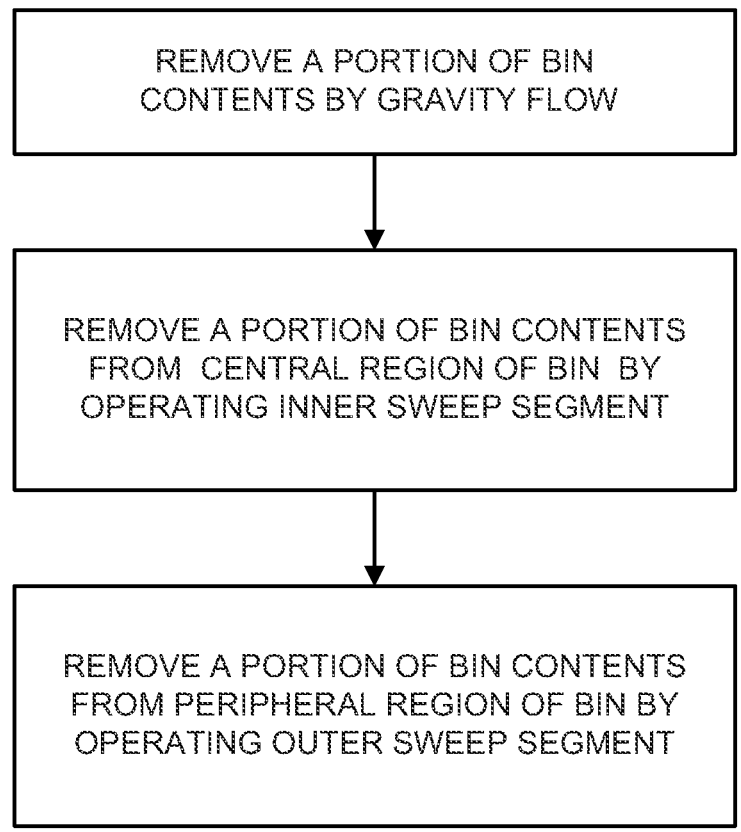
FIG. 6 is a schematic flow diagram of an illustrative process for unloading a storage bin.
Figure 7:
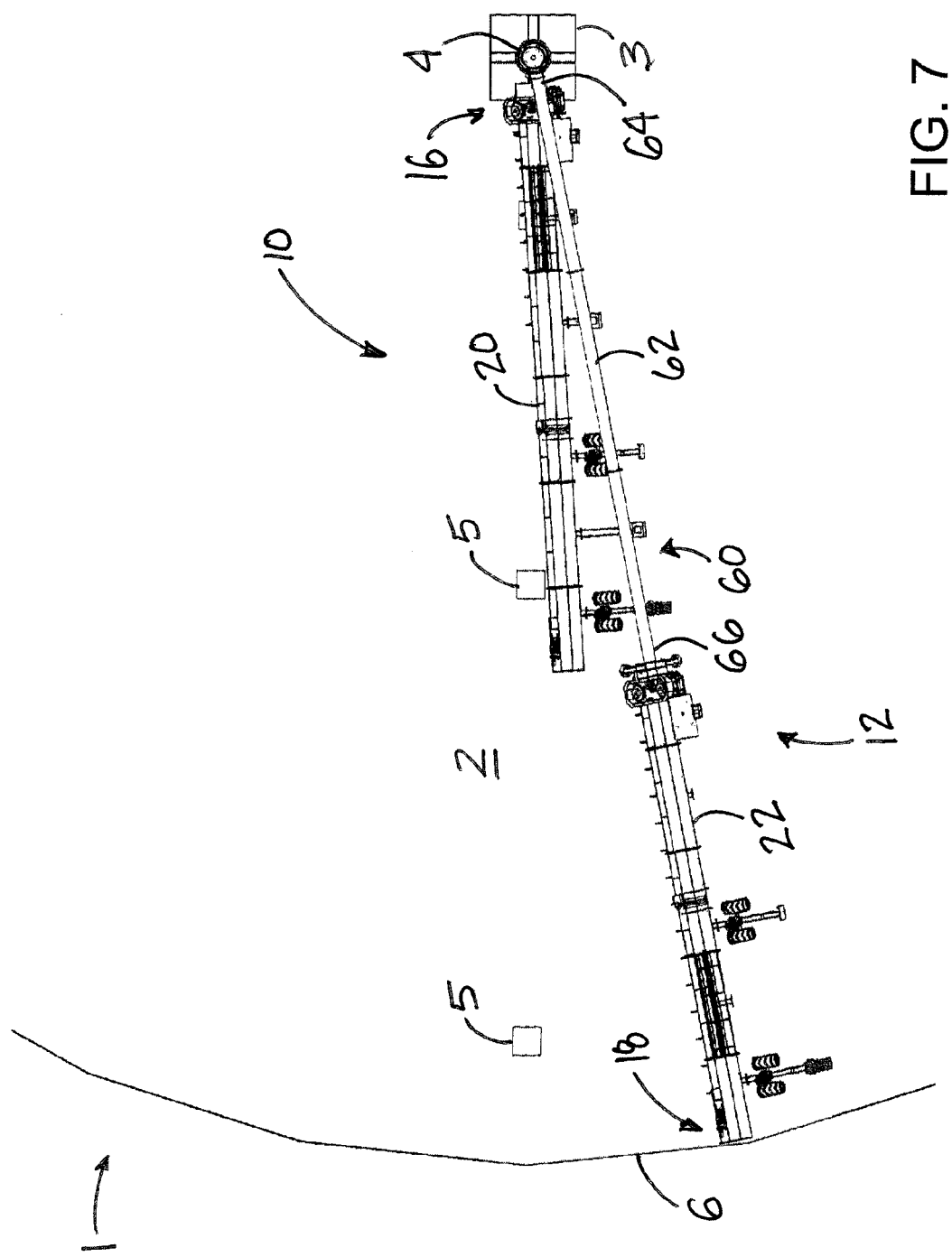
FIG. 7 is a schematic top view of an embodiment of an illustrative segmented sweep system in a support position.
Figure 8:
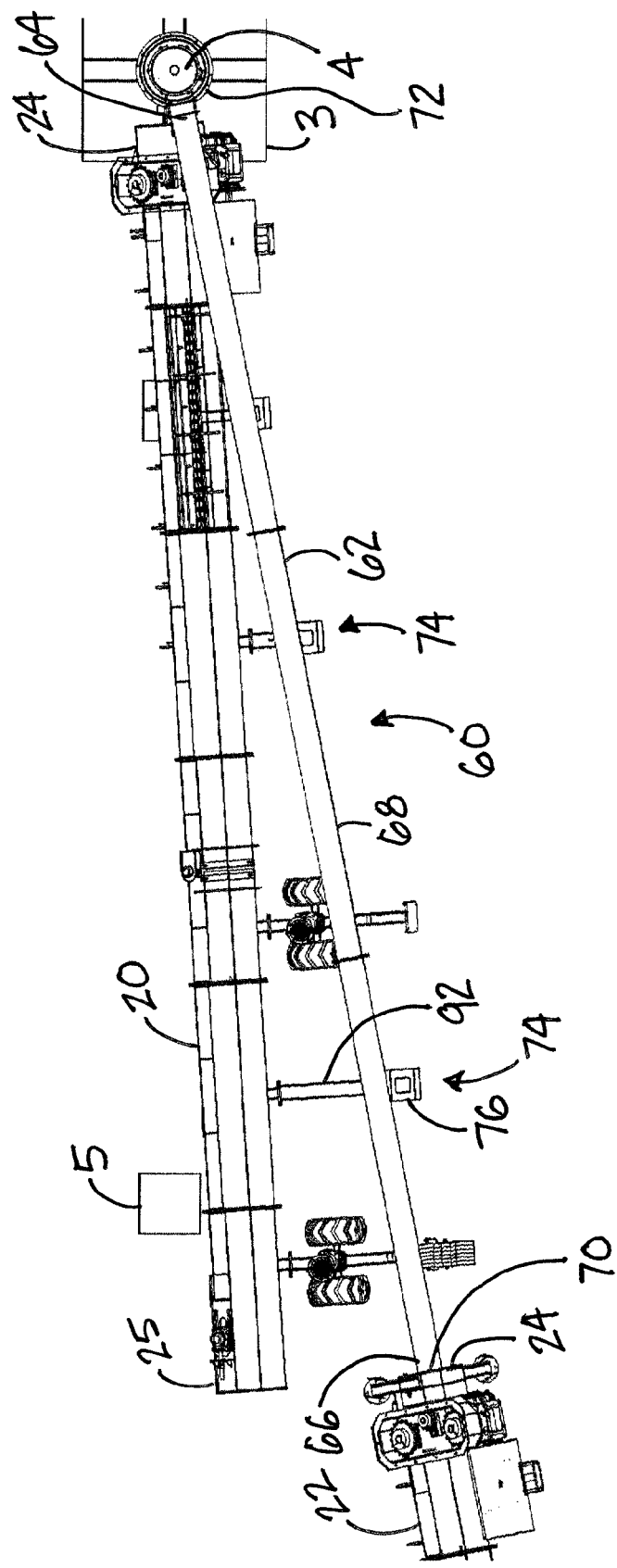
FIG. 8 is a schematic top view of a first sweep segment and a portion of a second weep segment of the illustrative segmented sweep system.
Figure 9:
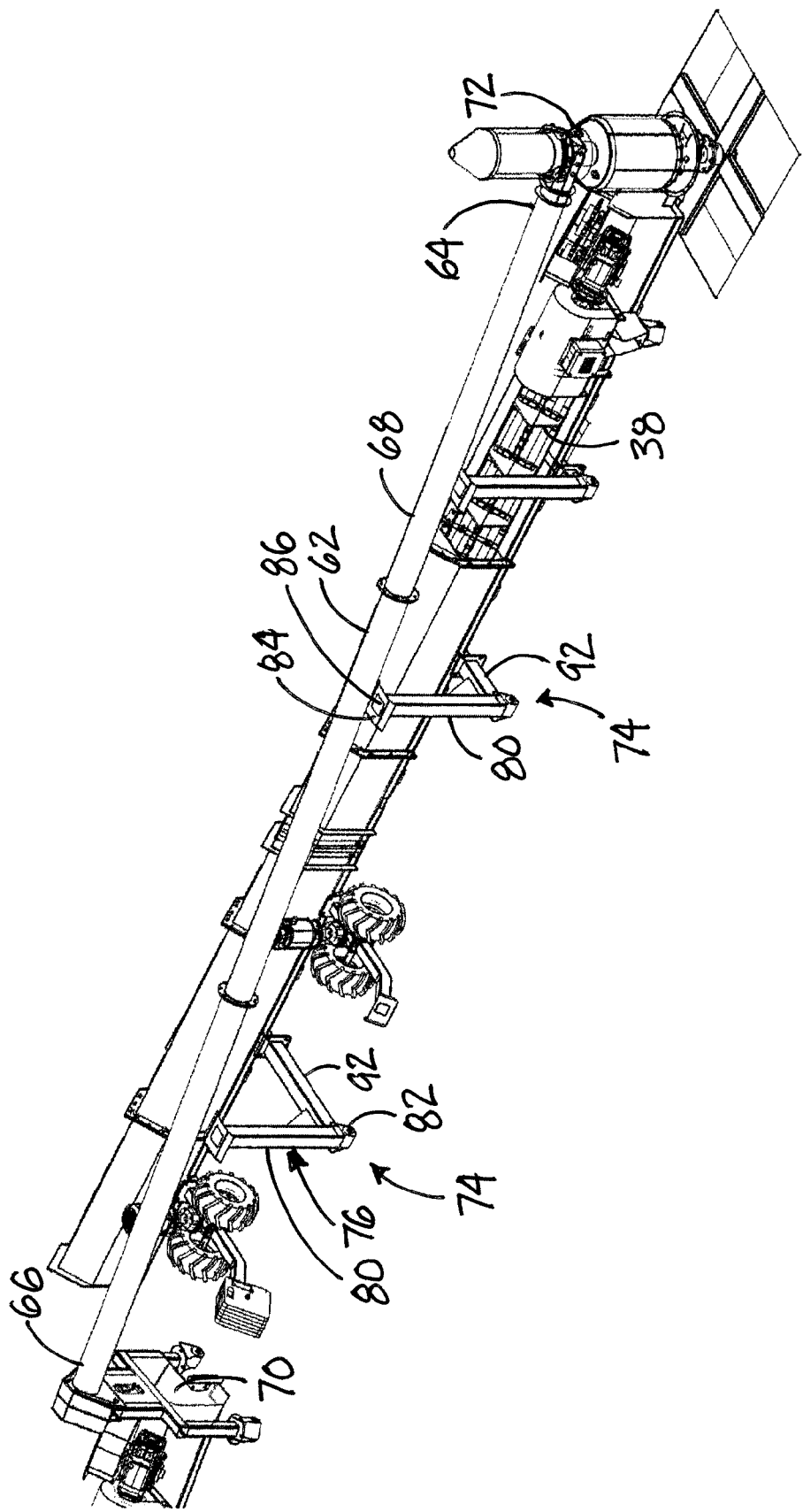
FIG. 9 is a schematic perspective view of the first sweep segment and a portion of the second sweep segment of the illustrative segmented sweep system.
Figure 10:
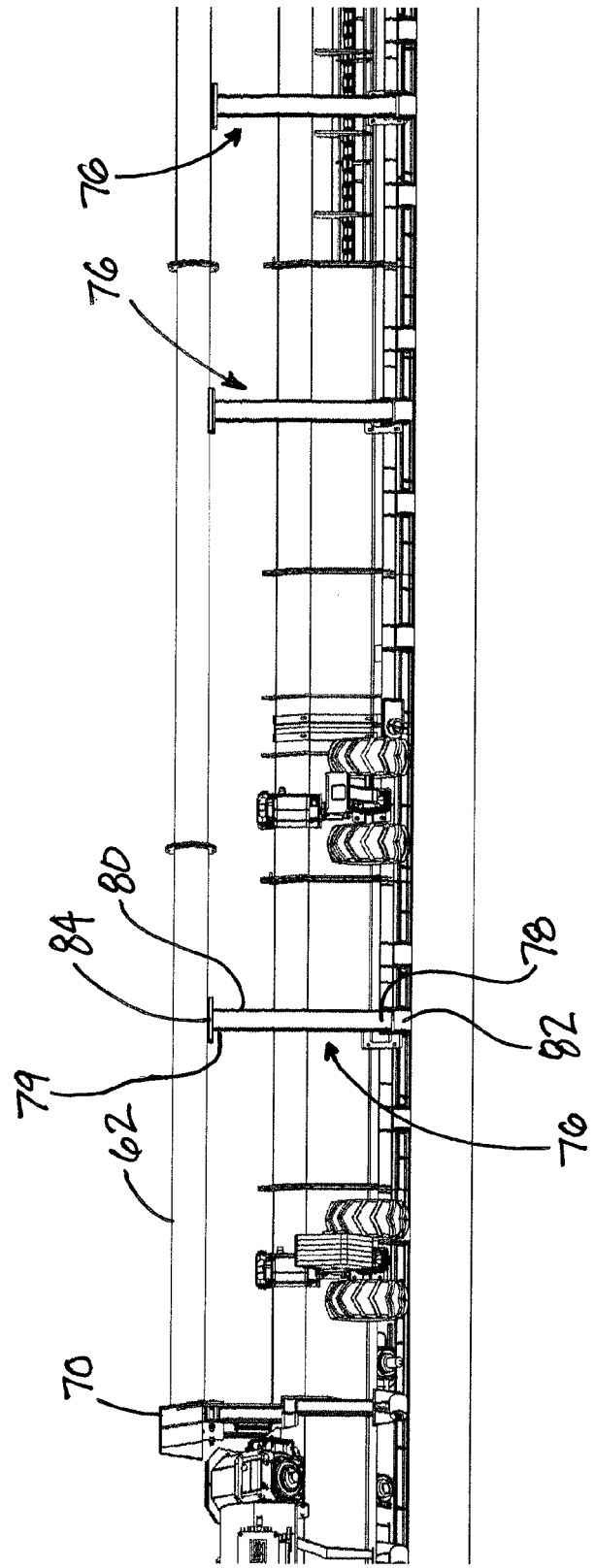
FIG. 10 is a schematic side view of the first sweep segment of the illustrative segmented sweep system.

The sweep assembly 12 may include structure for maintaining the first sweep segment 20 in a position that is relatively closer to the center post 4 and the second sweep assembly 22 in a position relatively farther from the center post (see FIGS. 4 and 5). The first sweep segment 20 may be positioned adjacent to the center post, and may be maintained at a relatively small spacing from the center, or with no spacing therebetween. The second sweep assembly may have a position spaced from the center post, and the spacing may be substantially and approximately equal to a length of the first sweep segment from the first inner end 26 to the first outer end 27, although this is not critical. The spacing of the second sweep segment from the center post may be such that the first sweep segment 20 is able to be positioned between the second sweep segment and the center post, and the first sweep segment is able to move or pass between the second sweep segment and the center post although this is not critical.

In some embodiments, the sweep assembly 12 may include a first tether structure 50 that tethers or connects the first sweep segment 20 to the center post. The first tether structure 50 may be configured to permit the first sweep segment to rotate about the center post, and may also be configured to permit radial shifting of the first sweep segment with respect to the center post. The first tether structure 50 may permit the first sweep segment to shift radially outwardly and inwardly with respect to the center post, such as between the home condition (see, e.g., FIGS. 3A and 3B) and the shifted condition (see e.g., FIGS. 3C and 3D) which is radially displaced from the home condition in an outward direction. The first tether structure 50 may permit the first sweep segment 20 to rotate with respect to the center post 4 in the home condition and the shifted condition. The first sweep segment 20 may move along a portion of the first tether structure when shifting radially outward and inward.

In some embodiments, the first tether structure 50 may include a lateral shift arm 52 that connects the first sweep segment 20 to the center post 4. The first sweep segment 20 may be laterally shiftable or slidable with respect to the lateral shift arm 52 so that the first sweep segment is able to move between the home and shifted conditions. Structure may be provided to cause the movement of the first sweep segment with respect to the center post, and may be incorporated into the shift arm. For example, an extensible and retractable actuator may be utilized to cause the radial movement of the first sweep segment, and the actuator may, for example, be of the hydraulic, pneumatic or mechanical type.

Embodiments of the sweep assembly 12 may also include a second tether structure 60 that tethers or connects the second sweep segment 22 to the center post 4 (see FIGS. 3 and 4). The second tether structure may be configured to permit the second sweep segment 22 to rotate about the center post, and may maintain a substantially uniform distance between the second sweep segment and the center post as the second sweep segment moves about the center post. The second tether structure may set the distance between the second inner end 26 of the second sweep segment and the center post. The second tether structure 60 may be independent and substantially separate of the first sweep segment 20 as well as the first tether structure 50 such that the second tether structure is movable with the second sweep segment independent of the first sweep segment. The second tether structure 60 may be connected to the center post and to the second sweep segment, such as to the second inner end 26. The second tether structure 60 may extend along the first sweep segment 20 when the sweep segments 20, 22 are in the aligned condition of the sweep segments.

In some embodiments, the second tether assembly 60 may include a tether arm 62 that connects the second sweep segment to the center post. The tether arm may have a substantially fixed length between the center post and the second sweep segment to allow the sweep segment to move along a path at a distance that is substantially uniform about the center. The tether arm may carry various suitable power and control connections for the second sweep segment. The tether arm 62 may have an inboard end 64 and an outboard end 66, and may extend from the center post 4 to the second sweep segment 22. The tether arm 62 may be substantially horizontally oriented, and may be located a suitable distance above the floor surface 2 to permit the first segment to pass below the arm. The arm 62 may include two or more sections 68 connected together to produce a suitable length of the arm, and may comprise two or more pipes connected end to end and may also be hollow to carry power and control signals. The tether arm may include a sweep connector 70 at the outboard end 66 which connects to the housing 31 of the second sweep segment 22. The sweep connector 70 may extend upwardly from the housing 31 to a height suitable to connect to the pipe of the arm.

The second tether assembly may include a tether connector 72 at the inboard end 64 of the tether arm to rotatably connect to the center post. One highly suitable structure for connecting the tether to the center post is disclosed in U.S. provisional patent application No. 62/126,921, filed Mar. 2, 2015.

The second tether structure may also include a support assembly 74 for supporting the tether arm 62 in at least one rotational position which may be advantageous when the bin in which the sweep system is located is full of grain or other particulate material and the weight of the material tends to press downwardly on the tether arm. The support assembly 74 may support the tether arm in a rotational position of the second sweep segment 22 relative to the first sweep segment 20, which may be a single position, and may be a support position of the first and second sweep segments relative to each other (see FIGS. 7 through 11). The support position may be characterized by the first and second sweep segments being unaligned with the respective longitudinal axes 21, 23 being offset from each other.

The support assembly 74 may comprise at least one stanchion 76 for engaging the floor surface 2 and the tether arm 62 when the arm is in the support position. The at least one stanchion may comprise a plurality of stanchions 76 that are positioned along a length of the tether arm, and may be substantially equidistantly spaced along a length of the tether arm. The stanchions 76 may have a lower end 78 and an upper end 79. Each stanchion 76 may include a post 80 extending between the lower 78 and upper 79 ends of the stanchion, and the post may be substantially vertically oriented although other orientations may be utilized. Each of the stanchions may also include a wheel 82 located at the lower end 78 of the stanchion, and the wheel may be mounted to the post. The stanchions may also include a support interface 84 at the upper end 79 of the stanchion and may define a generally horizontal support surface 86 for resting a portion of the tether arm upon. The support surface may have a height generally corresponding to a height of the tether arm 62 above the floor surface. The support surface may have an inclined entry surface 88 and an inclined exit surface 90 to facilitate the movement of the tether arm onto and off of the stanchion. In some embodiments, the support interface comprises a plate mounted on the post. The support assembly 74 may also include a connector 92 connecting the stanchion 76 to the first sweep segment such that the stanchion or stanchions move with the first sweep segment as it rotates about the center post. The connector 92 may extend from the stanchion to the first sweep segment, and the connector extending rearwardly from the first sweep segment. The connector 92 may be connected to the housing of the first sweep segment and may be connected to the stanchion toward the lower end 78, such as to the post. The connector 92 may be substantially horizontally oriented, and may have varying lengths to accommodate the varying distance between the unaligned sweep segments.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps shown in the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A bin sweep system for a bin having a floor surface and a central well, the system comprising:
   a center post defining a common center;
   a sweep assembly configured to move across the floor surface of the bin and having an inboard end and an outboard end, the sweep assembly comprising at least two sweep segments including a first sweep segment and a second sweep segment, the first sweep segment being located toward the inboard end and the second sweep segment being located toward the outboard end;
   wherein at least one said sweep segment is movable about the center post substantially independently of another said sweep segment.

2. The system of claim 1 wherein the first and second sweep segments have an aligned condition characterized by a portion of a longitudinal axis of the first sweep segment and a portion of a longitudinal axis of the second sweep segment being substantially aligned, and an unaligned condition characterized by a portion of the longitudinal axis of the first sweep segment and a portion of the of the longitudinal axis of the second sweep segment not being aligned.

3. The system of claim 1 wherein one of the sweep segments is configured to rotate past a position of an other one of the sweep segments.

4. The system of claim 1 wherein at least one of the sweep segments is configured to rotate about the center post while an other one of the sweep segments remains stationary with respect to the center post.

5. The system of claim 1 additionally comprising a tether structure configured to connect one of the sweep segments to the center post in a radially spaced relationship such that an other one of the sweep segments is rotatably movable between the one sweep segment and the center post.

6. The system of claim 5 wherein the other sweep segment moves below the tether structure.

7. The system of claim 5 wherein the tether structure further comprises a support assembly configured to support a tether arm of the tether structure in at least one position of the one sweep segment with respect to the other sweep segment.

8. The system of claim 7 wherein the support assembly is mounted on the other sweep segment.

9. The system of claim 1 wherein one of the sweep segments is radially shiftable with respect to the center post.

10. The system of claim 1 wherein each of the sweep segments has a particulate sweep structure including a plurality of paddles for moving the particulate material toward the center post.

11. A bin sweep system for a bin having a floor surface and a central well, the system comprising:
    a center post defining a common center;
    a sweep assembly configured to move across the floor surface of the bin and having an inboard end and an outboard end, the sweep assembly comprising at least two sweep segments including a first sweep segment and a second sweep segment, each of the sweep segments having a particulate sweep structure including a plurality of paddles for moving the particulate material toward the center post, the first sweep segment being located toward the inboard end and the second sweep segment being located toward the outboard end such that a space is formed between the second sweep segment and the center post and the first segment is movable between the second sweep segment and the center post;
    wherein the first and second sweep segment are rotatable about the center post substantially independently of each other.

12. The system of claim 11 wherein the first and second sweep segments are movable into an aligned condition characterized by a portion of a longitudinal axis of the first sweep segment and a portion of a longitudinal axis of the second sweep segment being aligned, the first and second sweep segments being movable into an unaligned condition characterized by a portion of the longitudinal axis of the first sweep segment and a portion of the of the longitudinal axis of the second sweep segment not being aligned.

13. The system of claim 11 wherein one of the sweep segments is configured to rotate past a position of an other one of the sweep segments.

14. The system of claim 11 wherein at least one of the sweep segments is configured to rotate about the center post while an other one of the sweep segments remains stationary with respect to the center post.

15. The system of claim 11 additionally comprising a tether structure configured to connect one of the sweep segments to the center post in a radially spaced relationship such that an other one of the sweep segments is rotatably movable between the one sweep segment and the center post.

16. The system of claim 15 wherein the other sweep segment moves below the tether structure.

17. The system of claim 15 wherein the tether structure further comprises a support assembly configured to support a tether arm of the tether structure in at least one position of the one sweep segment with respect to the other sweep segment.

18. The system of claim 17 wherein the support assembly is mounted on the other sweep segment.

19. The system of claim 11 wherein one of the sweep segments is radially shiftable with respect to the center post.

* * * * *